Oct. 3, 1961 P. A. NOXON ET AL 3,002,713
AIRCRAFT CONTROL SYSTEM
Filed Dec. 19, 1955 9 Sheets-Sheet 6
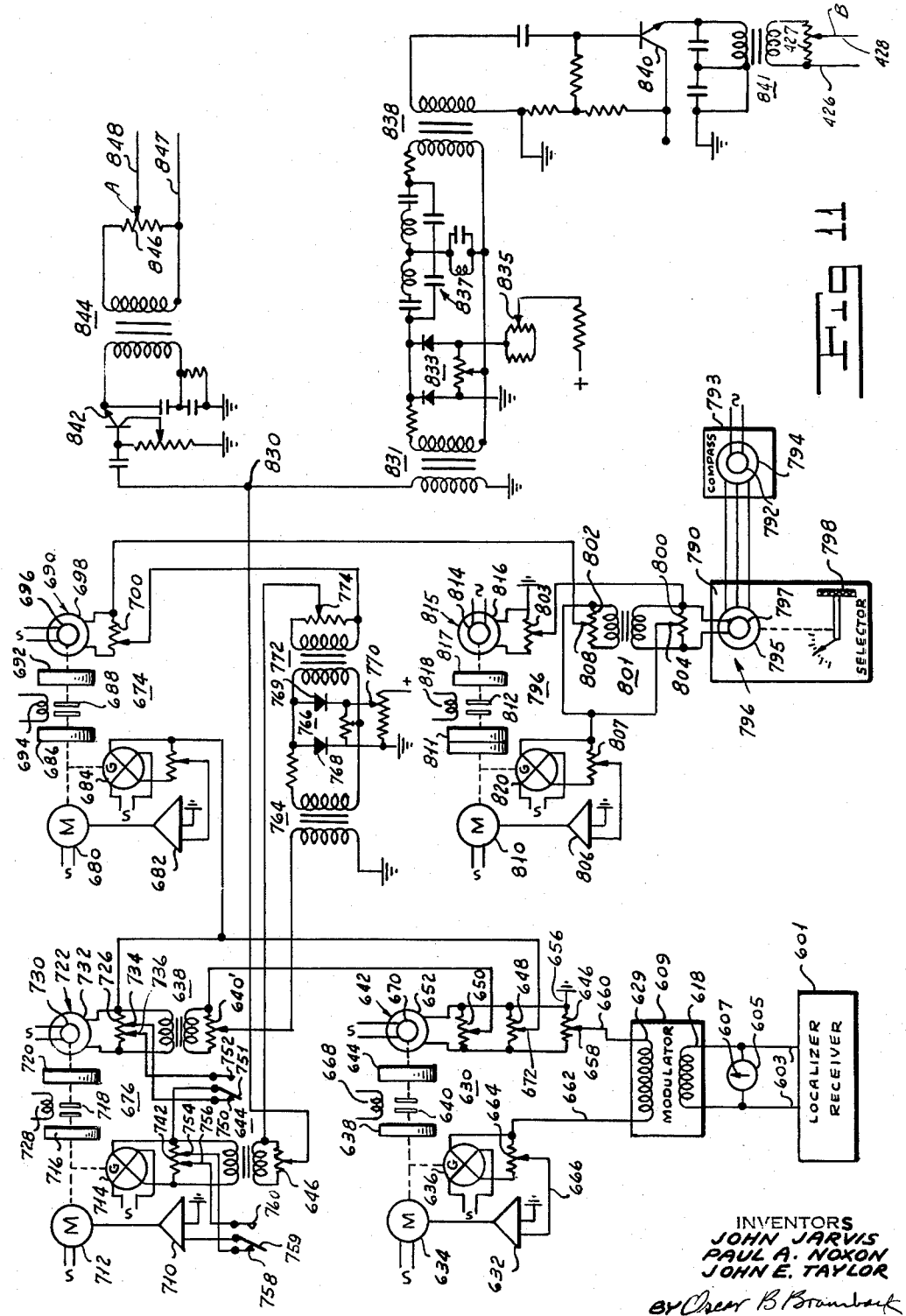
INVENTORS
JOHN JARVIS
PAUL A. NOXON
JOHN E. TAYLOR
BY Creer B Brombeck
ATTORNEY

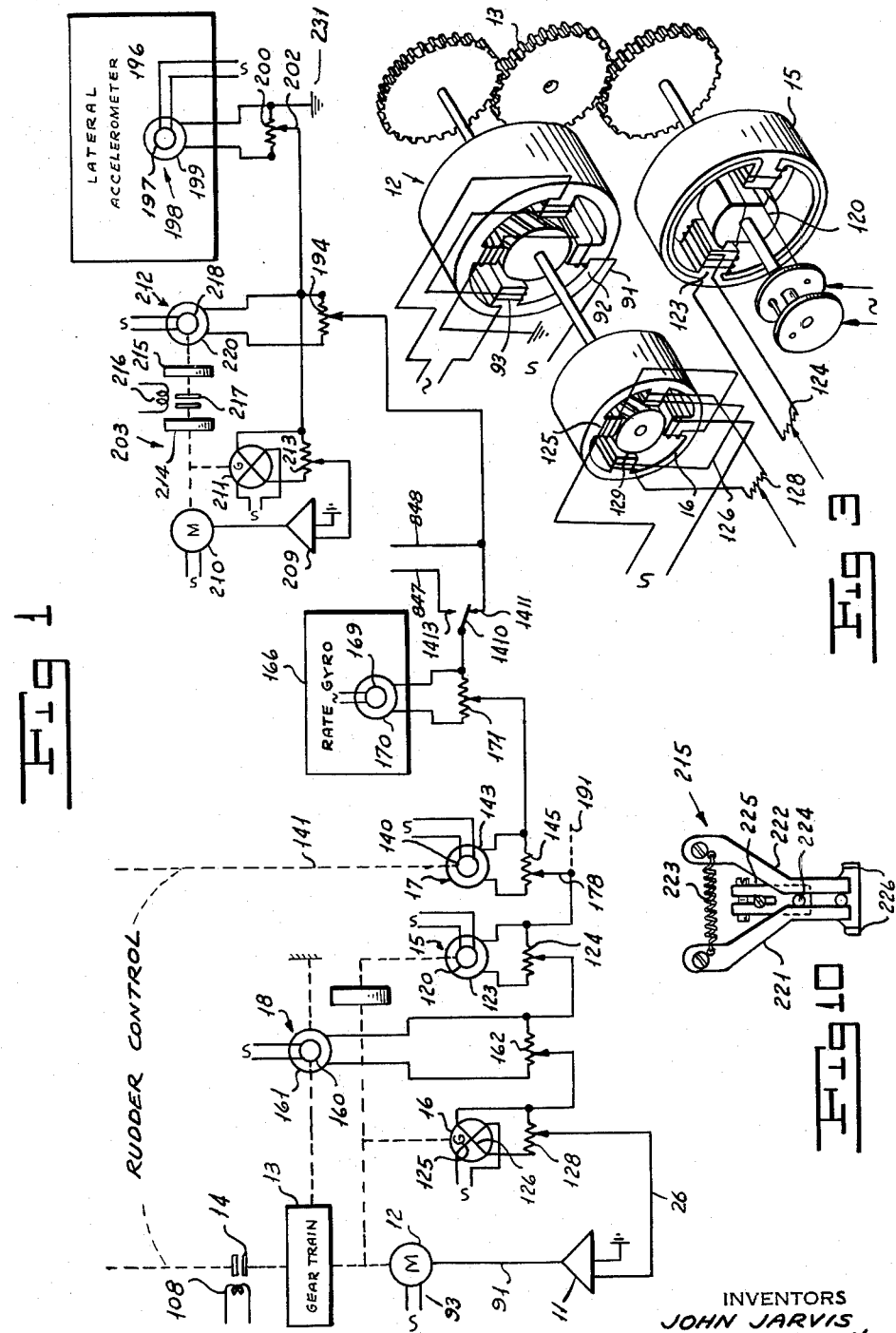
INVENTORS
JOHN JARVIS
PAUL A. NOXON
JOHN E. TAYLOR
BY Oscar B. Brumback
ATTORNEY Oct. 3, 1961  P. A. NOXON ET AL  3,002,713
AIRCRAFT CONTROL SYSTEM
Filed Dec. 19, 1955  9 Sheets-Sheet 2
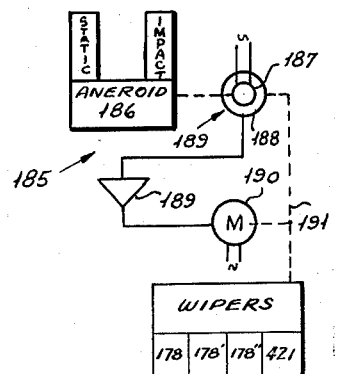
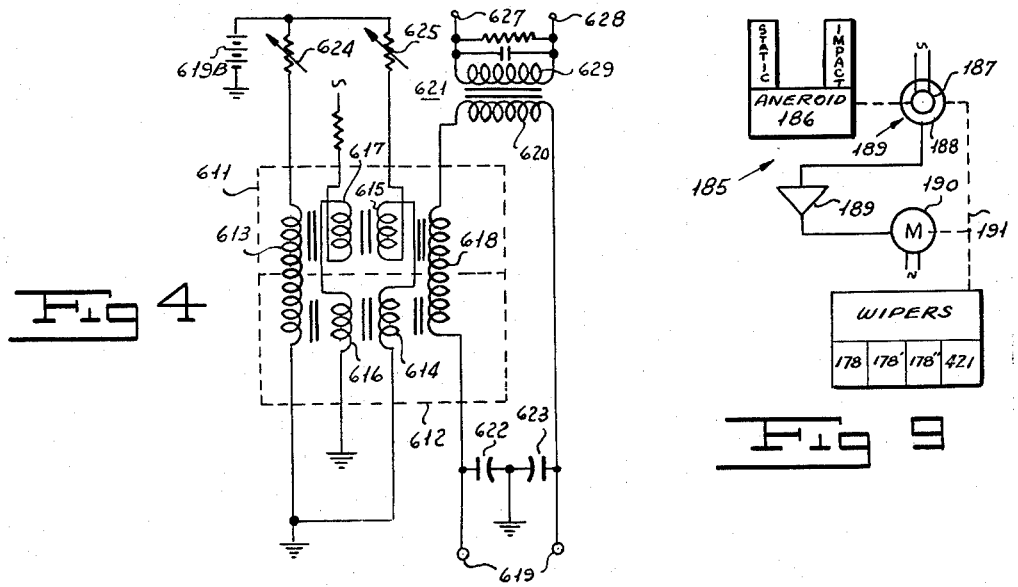
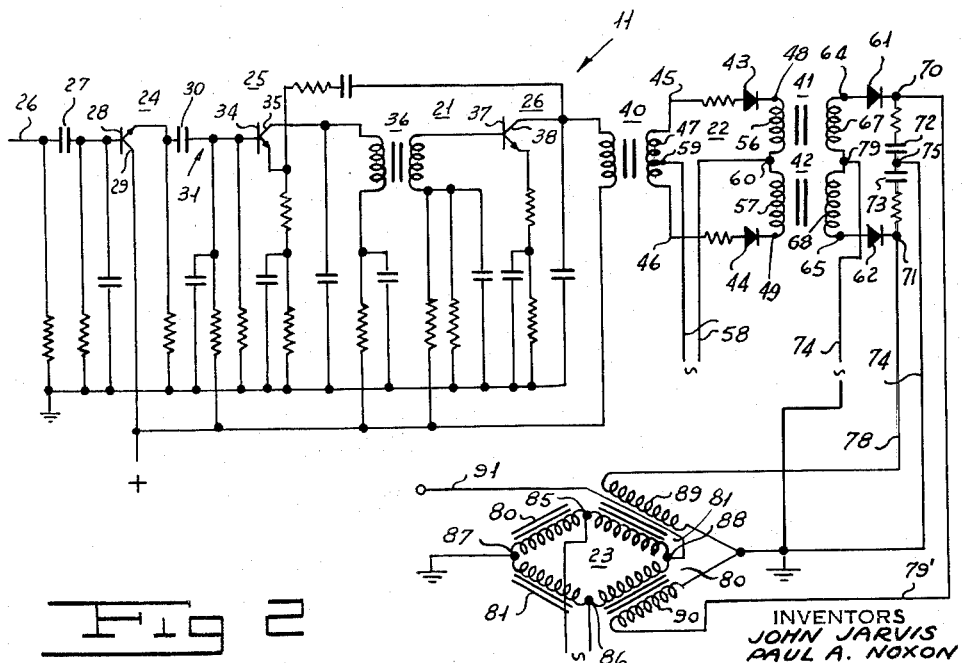
INVENTORS
JOHN JARVIS
PAUL A. NOXON
JOHN E. TAYLOR
BY Oscar B Brumback
ATTORNEY

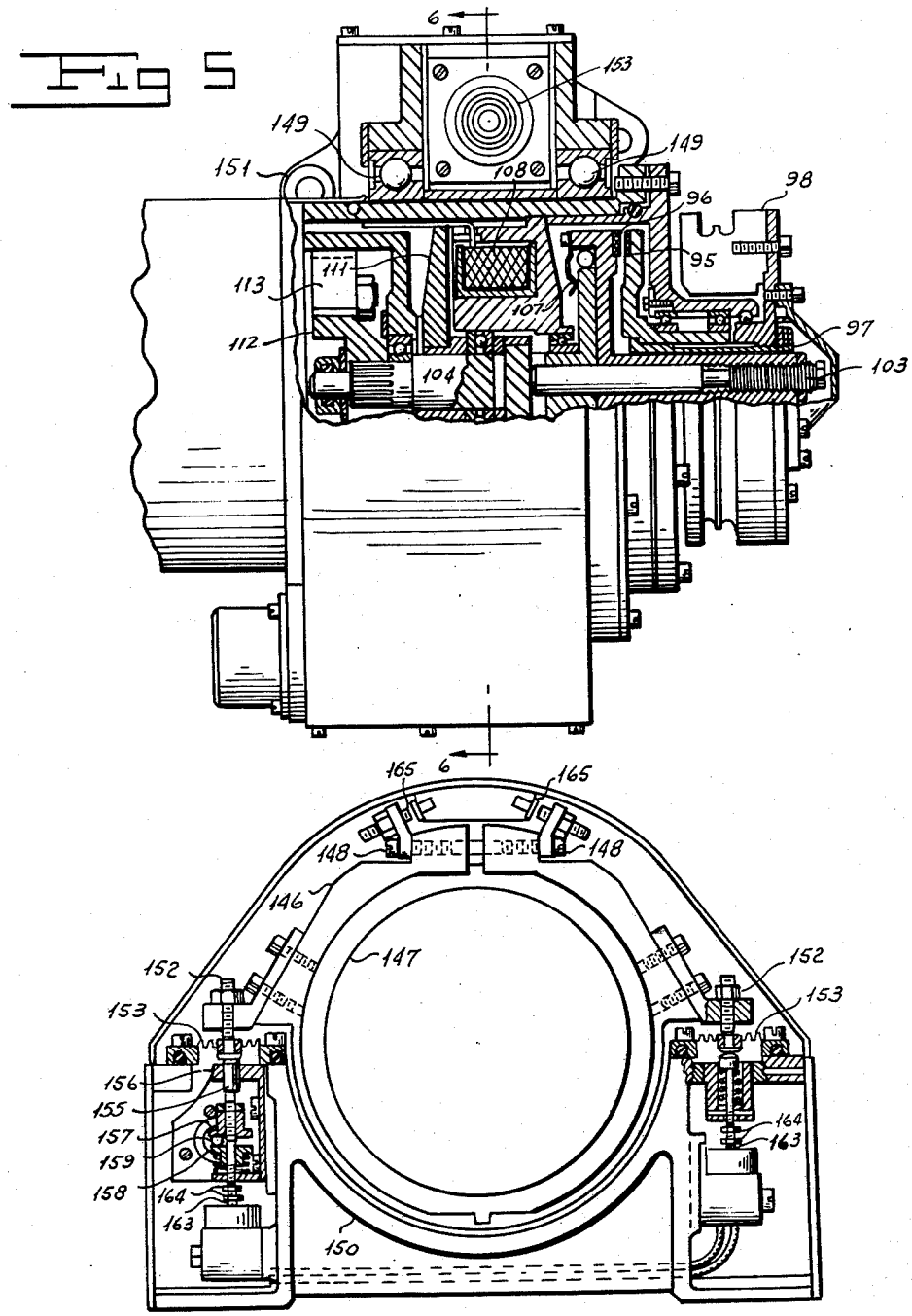

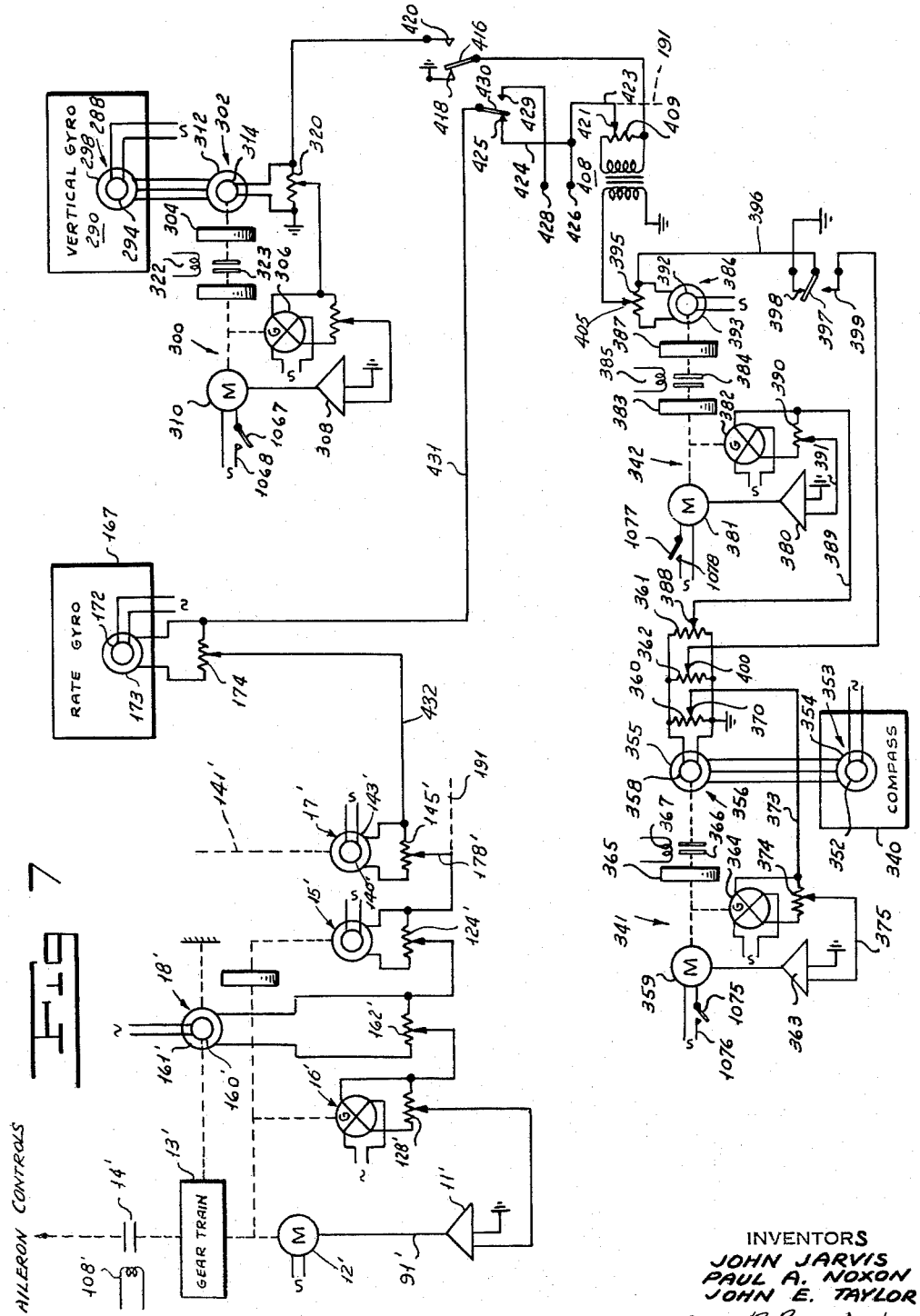

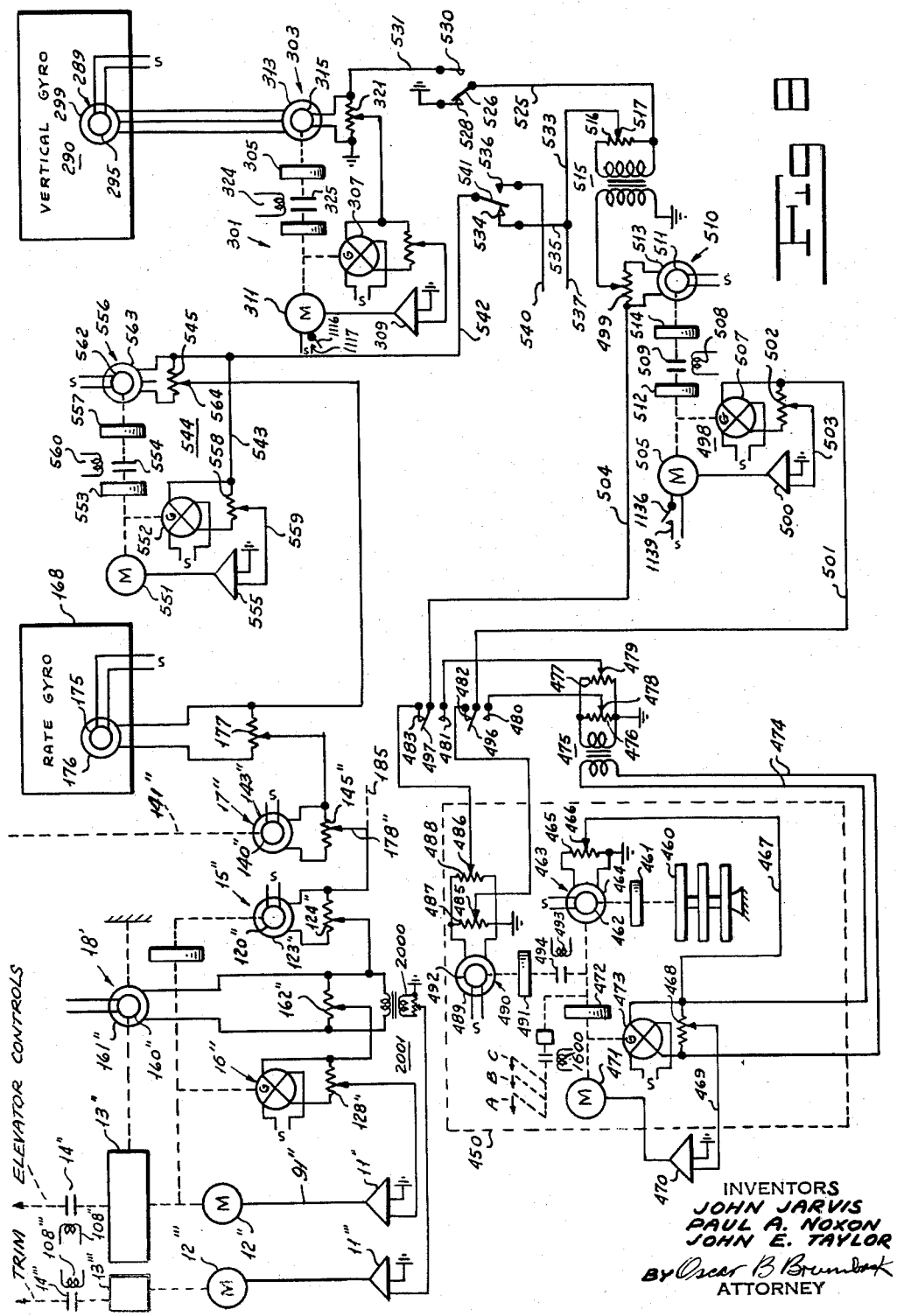

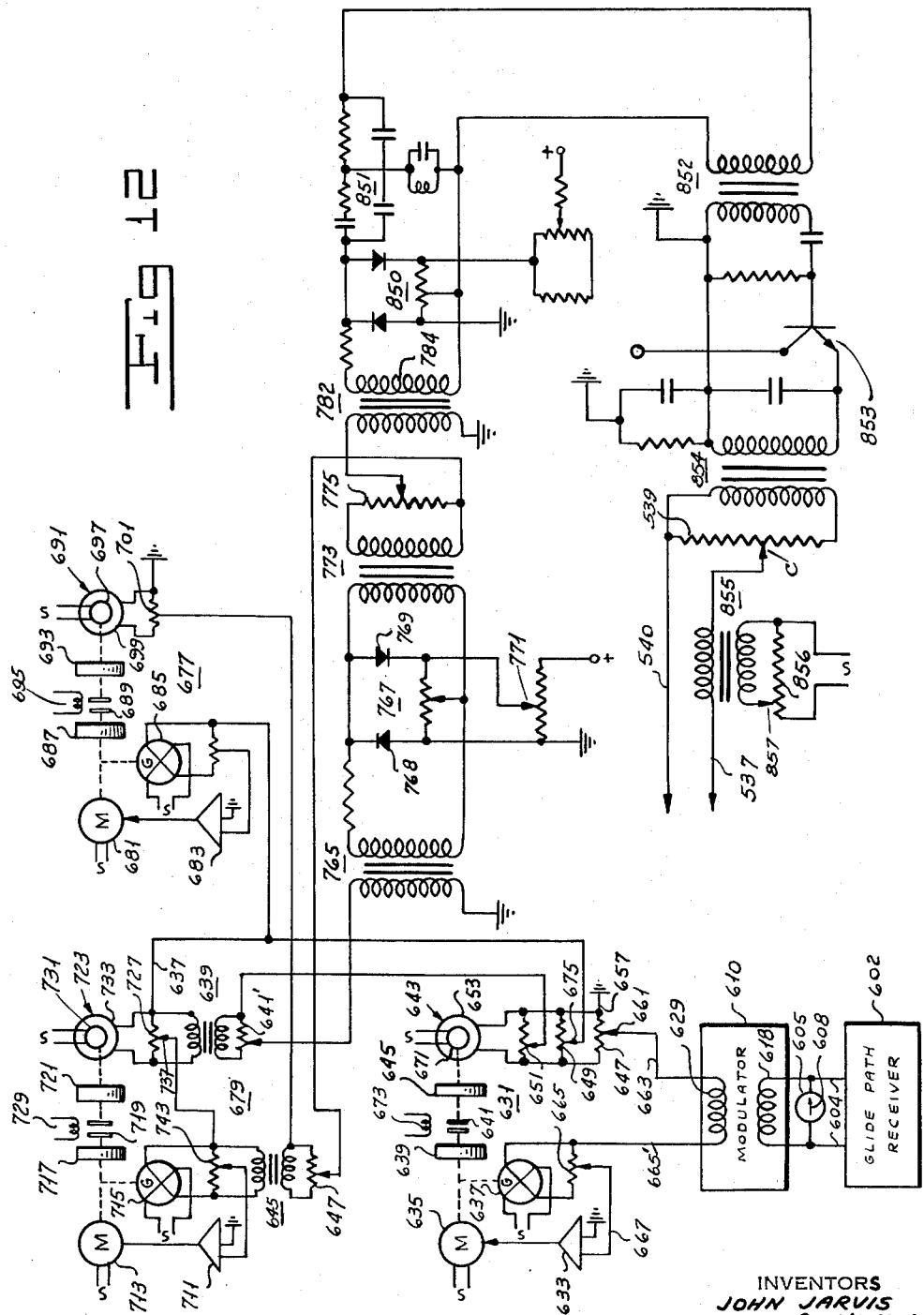

Oct. 3, 1961    P. A. NOXON ET AL    3,002,713
AIRCRAFT CONTROL SYSTEM
Filed Dec. 19, 1955    9 Sheets-Sheet 8
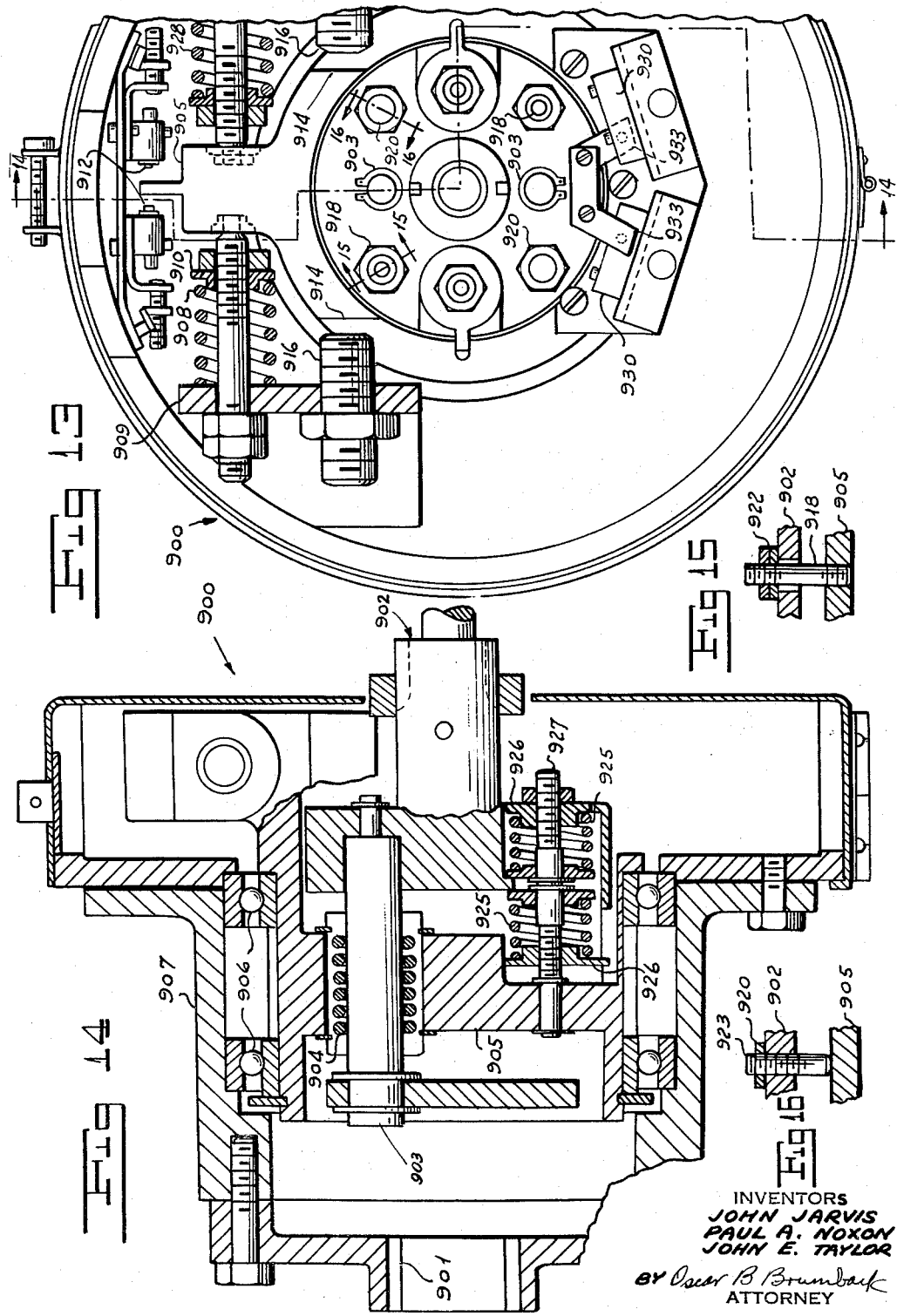
INVENTORS
JOHN JARVIS
PAUL A. NOXON
JOHN E. TAYLOR
BY Oscar B Brumback
ATTORNEY

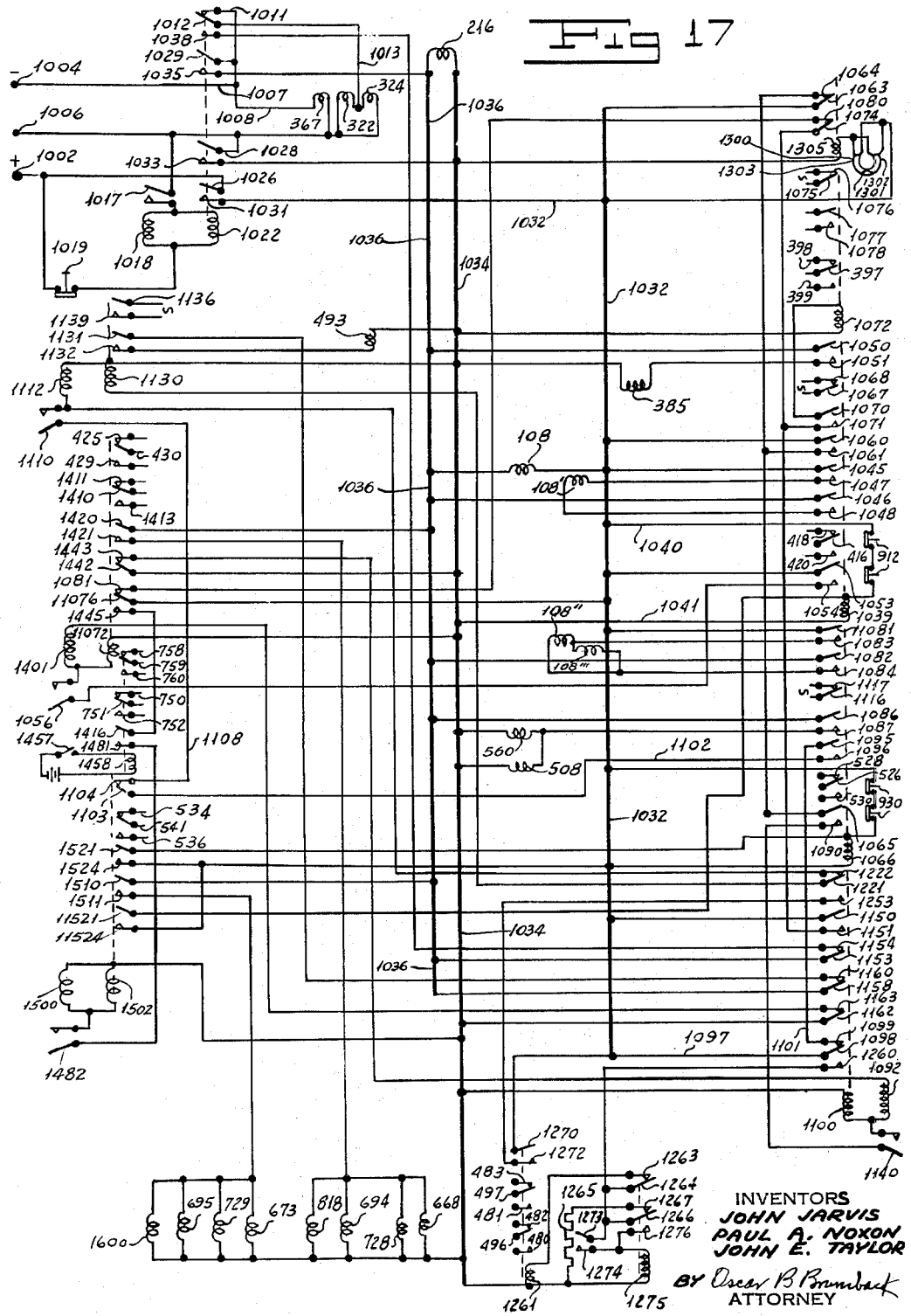

United States Patent Office 3,002,713
Patented Oct. 3, 1961

3,002,713
AIRCRAFT CONTROL SYSTEM
Paul A. Noxon, Tenafly, and John E. Taylor, New Milford, N.J., and John Jarvis, Mount Clemens, Mich., assignors to The Bendix Corporation, a corporation of Delaware
Filed Dec. 19, 1955, Ser. No. 553,777
22 Claims. (Cl. 244—77)

This invention relates generally to automatic control systems for aircraft.

The present invention contemplates an automatic control system for aircraft with provision for controlling the craft about the pitch and/or roll control channels manually while the craft is being controlled automatically about the other channels. The contemplated system controls the craft in response to craft body references, earth and heading references, and external references such as radio guide beams and includes integrators for providing more accurate control by reducing steady state error conditions.

An object of the present invention is to provide a novel aircraft control system in which the operation of a manual control to place the craft in a desired pitch or bank attitude renders the respective channel of the automatic control ineffective on the craft and release of the manually operable control renders the automatic control effective on the craft without further action on the part of the human pilot.

Another object is to provide an aircraft control system with novel automatically and manually operable means wherein the craft is returned to straight and level flight if the manual operation has not exceeded a predetermined extent and is maintained in the manually set attitude if the predetermined extent is exceeded.

A further object is to provide a novel control system which is engageable and disengageable from control of the craft and will return the craft to a predetermined pitch attitude if the craft is beyond this attitude when the system is engaged for control of the craft.

Another object is to provide an automatic control system for an aircraft which will change the pitch attitude to that required for level flight, if the constant altitude control be engaged at the time the aircraft is climbing or diving, and ultimately stabilize the craft at the engaged altitude, the craft being maintained at the selected altitude despite changes in trim resulting from conditions such as fuel consumption and load changes.

Still another object is to provide an aircraft control system with a novel provision by which the craft establishes a zero rate of climb during a predetermined time interval and thereafter is maintained in the attitude established during the zero rate of climb interval.

A further object is to provide an aircraft control system having a novel interlock between the manually operable controller and the localizer and glide path beam guidance portions of the automatic control system whereby the manually operable controller is rendered ineffective on the automatically operable portion when the glide path beam guidance portions are rendered operable, there also being an interlock between the localizer and glide path portions so that the glide path portion cannot be rendered operable until after the localizer portion is operated.

A still further object is to provide an aircraft control system with a beam guidance portion having electromechanical units for obtaining signals corresponding to the displacements of the craft from the beam and various rate and integrals thereof.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the drawings where like parts are marked alike:
FIGURE 1 illustrates schematically the yaw control channel signal chain of the novel aircraft control system of the present invention;
FIGURE 2 illustrates schematically a servo amplifier of the control channel of FIGURE 1;
FIGURE 3 illustrates schematically the rudder controlling servomotor of FIGURE 1;
FIGURE 4 illustrates schematically the modulator shown in block form in FIGURES 11 and 12;
FIGURE 5 is a plan view of servomotor of FIGURE 1 with sections broken out;
FIGURE 6 is an elevational section view taken along line 6—6 of FIGURE 5;
FIGURE 7 illustrates schematically the roll control channel of the novel aircraft control system of the present invention;
FIGURE 8 illustrates schematically the pitch control channel of the novel aircraft control system;
FIGURE 9 illustrates schematically the airspeed adjustment sensor;
FIGURE 10 illustrates schematically the centering arrangement for the inductive device in the signal chains of the novel aircraft control system of the present invention;
FIGURE 11 illustrates schematically the horizontal beam guidance portion of the novel aircraft control system;
FIGURE 12 illustrates schematically the vertical beam guidance portion of the aircraft control system of the present invention;
FIGURE 13 is a detail of the manual controller of the present invention with the cover removed;
FIGURE 14 is a sectional view taken along lines 14—14 of FIGURE 13;
FIGURE 15 is a sectional view taken along lines 15—15 of FIGURE 13;
FIGURE 16 is a sectional view taken along lines 16—16 of FIGURE 13; and
FIGURE 17 illustrates schematically the relay system of the aircraft control system.

An automatic steering system for an aircraft may be considered to comprise three interrelated channels for controlling the craft about each of its three axes: roll, pitch and yaw. Each channel includes devices which sense the deviation of the craft from a desired condition to develop corresponding control effects and devices which interpret the control effect and apply a control action to the craft to correct for the deviation.

In the novel automatic pilot system herein, devices sense the rate of change of pitch, roll and yaw attitudes and under certain conditions the rate of change of altitude, the extent of displacement of the aircraft from the reference bank attitude, pitch attitude, heading and altitude, the lateral acceleration and the amount and rate of control surface displacement. These signals are summed to produce a control voltage which operates the servo to adjust the position of the control surface.

The devices which interpret the control effect and the devices which apply the control action to the craft may be identical for each channel. Therefore, a typical unit will be discussed in detail with reference to FIGURE 1 and corresponding units in each channel will be shown with prime references.

Turning now to FIGURE 1, the device for applying the control action to the craft comprises generally an amplifier 11, a motor 12, a gear train 13, a solenoid actuated clutch 14, a shaft position transmitter 15, a rate generator 16, a surface position transmitter 17, and a torque sensor 18. Gear train 13 is linked to a pulley or its equivalent and increases the torque delivered by the motor so that the output torque at the pulley is large enough to move the control surface.

Amplifier 11, FIGURE 2, comprises generally a preamplifier stage 21, a demodulator stage 22, and a magnetic amplifier stage 23. Preamplifier stage 21 may be generally similar to that described in copending application Serial No. 487,239, now abandoned; demodulator stage 22 may be generally similar to that described in copending application Serial No. 459,488, now Patent No. 2,797,384; and magnetic amplifier stage 23 generally similar to that described in copending application Serial No. 346,234, now Patent No. 2,769,122; all the foregoing applications being assigned to the assignee of the present invention.

Preamplifier stage 21 comprises three conventional NPN transistors 24, 25 and 26, each having conventional base, emitter, and collector electrodes. The control signal is applied via lead 26' through a blocking capacitor 27 to the base electrode 28 of transistor 24 whose output from the collector plate 29 is applied through blocking condenser 30 to the base electrode 34 of transistor 25. The output from the collector electrode 35 of the transistor 25 is coupled by an inter-stage transformer 36 to the base electrode 37 of transistor 26 whose output from collector electrode 38 is coupled by a transformer 40 to demodulator stage 22.

Demodulator stage 22 comprises a pair of saturable transformers 41 and 42 having cores of a suitable material with a square hysteresis curve characteristic. A pair of diodes 43 and 44 connect the end terminals 45, 46 of secondary winding 47 of transformer 40 with end terminals 48 and 49 of the primary windings 56 and 57 of transformers 41 and 42. A pair of leads 58 connect a suitable source of alternating current to the center tap 59 of secondary winding 47 and to the common junction 60 of primary windings 56 and 57. A pair of diodes 61 and 62 connect the end terminals 64 and 65 of the secondary windings 67 and 68 of transformers 41 and 42 with output terminals 70 and 71. A pair of capacitors 72 and 73 connect terminals 70 and 71, and a pair of leads 74 connect a suitable source of alternating current to the common junctions 75 and 79 of capacitors 72 and 73 and secondary windings 67 and 68. The connections of the alternating current source across leads 58 and 74 are so arranged that rectifiers 43 and 61 are rendered conductive on opposite half cycles and rectifiers 44 and 62 are rendered conductive on opposite half cycles.

During a no-signal condition at the input 40 to demodulator 22, diodes 61 and 62 conduct equally so no net signal appears across terminals 70 and 71. During the half cycle in which rectifier 61 is conductive, the core tends to be saturated with direct current flux. The saturation point is reached as the peak voltage is reached at the quarter cycle of conduction and subtsantially the total voltage applied at terminal 79 is conducted thereafter. During the subsequent half cycle, rectifier 61 becomes non-conductive and rectifier 43 becomes conductive. The conduction of rectifier 43, being in the opposite direction, decreases the direct current flux of the core to the zero starting point. This same condition exists at rectifiers 44 and 62. Thus, the equal and opposite voltages across leads 70 and 71 give a zero net voltage.

When a signal is applied across transformer 40, the signal will add to the conduction of one diode 43 or 44 and subtract from the conduction of the other. The increased conduction of this one diode lowers the reset saturation condition to a greater extent than normal, and the decreased conduction of the other diode will not bring the core back to the normal reset saturation level. The core which has not been returned to the reset level lets its associated diode 61 or 62 be rendered completely conductive earlier than the quarter cycle and a greater voltage is applied at its output terminal. Conversely, the lowered reset level of the other core causes this core to become staturated at some time later than the quarter cycle; thus, a period greater than the normal quarter cycle is required for the diode to saturate the core and less than the normal voltage is applied to its output terminal. The voltage across terminals 70 and 71 is no longer balanced, and the unbalance corresponds in magnitude and sense to the amplitude and phase of the signal applied across transformer 40. This output at terminals 70 and 71 is transmitted by leads 78 and 79' to magnetic amplifier stage 23.

Magnetic amplifier 23 may be comprised of two saturable inductors 80 and 81, each having a saturable core with three windings. Two of the windings are excited by an alternating current and one winding is excited by direct current. The two windings of the cores are connected together to form a normally balanced inductance bridge having alternating current connected across diagonals 85 and 86 and output terminals connected across diagonals 87 and 88. The third coils or control windings are connected to terminals 70 and 71 of demodulator 22.

No output is developed across terminals 87 and 88 of magnetic amplifier 23 when the direct currents through control windings 89 and 90 are equal. This saturates the inductors alike; opposite sides present equal impedance path to the alternating current and the bridge is balanced. However, upon a change in the direct current through leads 78 and 79', one inductor becomes saturated to a greater extent and the other inductor becomes saturated to a lesser extent. This changes the impedance in opposite arms of the inductance bridge. The bridge is unbalanced; and a corresponding output is developed across terminals 87 and 88. The phase of this output depends upon the sense of the differential excitation to the control windings 89 and 90.

Connected across terminals 87 and 88 by lead 91 is the variable phase winding 92 of a conventional induction type motor 12, FIGURES 1 and 3, whose fixed phase winding 93 is constantly energized. Depending upon the phase of the voltage in the variable phase winding, motor 12 operates in a clockwise or counter-clockwise direction to drive a gear train 13. The other motors and amplifiers shown in block form throughout the drawings may be of similar types.

A driving connection between gear train 13 and the surface is established by a servo clutch 14, FIGURE 5. One face 95 of this clutch is fixed to a shaft 97 and the other face 96 is fixed to a shaft 103 which is keyed to shaft 104 but is slidable longitudinally relatively thereto. A solenoid coil 108, when energized, urges a core 111 to the right stressing spring 107 to engage faces 95 and 96 to drivably connect shafts 103 and 97. Shaft 97 is connected by a pulley 98 and suitable means (not shown) to the movable control surface. A gear 112 fixed to the end of shaft 103 engages with a pinion 113 of gear train 13 driven by motor 12.

The shaft position transmitter 15, FIGURES 1 and 3, which measures the extent of operation of motor 12, may be a conventional inductive device whose rotor winding 120 is energized from a suitable source of alternating current (not shown) and whose stator winding 123 is connected across a potentiometer 124. Motor 12 through suitable gearing angularly displaces rotor 120 to develop across potentiometer 124 a signal in opposition to the command signal into amplifier 11.

Also geared to each servomotor is a rate generator which degeneratively feeds back voltages proportional to motor speed to prevent hunting due to the inertia of the motor and its moving parts tending to carry the motor past the null point and also to cause the motor to rotate at a speed proportional to the magnitude of the input signal to the amplifier. These rate generators 16 may be conventional having one winding 125 energized by a suitable source of alternating current, a second winding 126 connected across a potentiometer 128, and a rotor 129 driven by the motor shaft. Thus, as motor 12 turns, rate generator 16 produces across potentiometer 128 a signal which, up to a limit value, has an amplitude proportional to the speed of rotation of the motor shaft.

The voltage from the rate generator prevents the inertia of motor 12 from carrying it past the null point. For example, assume that motor 12 is driving the gearing and control surface to a null position and the various error signals become zero as this position is reached. Without a rate generator signal, the inertia of the motor, gearing and control surface would cause the control surface to overshoot the null position, and a new error signal would appear at position transmitter 15 to drive the control surface back to null. This condition would continue, and oscillation about the null position would result. The rate generator minimizes such oscillation because the rate generator signal still exists when the error signal is reduced to null if inertia is causing the motor to continue to turn. Since the rate generator voltage always opposes the error voltage, it now attempts to turn the motor in a direction opposite to the direction in which it is turning, causing the motor to quickly stop turning; the overshooting of the null position, if any, is small. This rate generator voltage does not cause the motor to reverse its direction of rotation; it merely opposes servomotor rotation by subtracting from the total voltage so that the total signal input becomes zero sooner than normal. Thus, the motor slows to a stop, with the generator voltage providing a braking.

The voltage from the rate generator also continuously damps the motor operation by opposing erratic changes in motor speed. When the speed of motor 12 tends to increase beyond a value determined by the amplitude of the combined signal to the amplifier input, the signal from the rate generator decreases the total signal to the amplifier, thereby reducing the speed of the motor. Thus, the rate generator tends to maintain the speed of the motor in proportion of the amplitude of the command signal.

Motor 12, FIGURE 1, does not displace the main control surface directly but instead through a suitable pulley system or control linkage displaces an auxiliary control surface which, then, applies a load to the main control surface to displace it. In order to stop the operation of motor 12 when the main control surface has been sufficiently displaced, the rotor 140 of surface position transmitter 17 is connected by a suitable mechanical connection 141 to be angularly displaced relative to a stator 143 as the control surface is moved from the normal position, thereby developing a corresponding signal across a potentiometer 145.

The ratio between a displacement error voltage and the resulting movement of the control surface is a function of the surface position follow-up device voltage per degree of surface movement. For example, if the ratio of the surface feedback voltage applied to the signal chain for a predetermined movement of the control surface is high, the net voltage to the servo amplifier (displacement error voltage minus surface position feedback voltage) for a given displacement error voltage is greatly reduced for each degree of control surface movement; therefore, the output torque of the servo, and the amount of control surface movement which corresponds to the given displacement error voltage, is relatively small. The portion of the surface position feedback signal voltage from inductive device 17 is adjused by suitably connecting the wiper 178 of potentiometer 145 to the shaft 191 of a dynamic pressure sensor 185. Thus, the proportion of the total feedback voltage fed to the signal chain from each surface position follow-up device is made a function of indicated airspeed, and becomes a function of the dynamic air pressure.

In low inertia motor 12, the output torque produced by a particular input motor voltage increases as the length of time of operation increases. Since the resistive torque exerted by the friction in the control surface rigging may be almost as large as the maximum torque allowed on the control surface rigging, it may be necessary for the servomotor output torque to be held within a rather small range of values. To compensate for the tendency of the torque delivered by servomotor 12 to increase to a value that may after a period of time exceed the maximum allowable value, a torque feedback device (FIGURES 1, 5 and 6) is mounted in each servo to provide negative feedback proportional to the increase in torque.

Inductive device 18, FIGURE 1, provides a negative feedback signal corresponding to the torque exerted on the control surface by servomotor 12. A sleeve 146 is attached to the frame 147, FIGURES 5 and 6, enclosing the stator of the motor 12 by suitable means, such as bolts 148. The sleeve is journaled by bearings 149 in a cradle 150 that is secured to the aircraft by suitable means, such as bolts 151. Thus, as the motor exerts a torque on the control surface in one direction, the stator of the motor tends to turn in an opposite direction. Projecting members 152 engage diaphragms 153 which resist this tendency. Thus, the extent that the cradle assembly turns is a measure of the motor output and the extent of the displacement of projection 152 in either direction from a normal position depends upon the torque exerted on the surface.

To measure the movement, one pin 152 engages a further pin 155 which is slidable in a bracket 156 and has thereon a pair of arms 157 and 158 which engage a projection 159 fixed eccentrically to the shaft of rotor 160, FIGURE 1, of inductive device 18. Thus, as the linear displacement of the pin angularly displaces the rotor 160 relative to the stator 161 by an amount corresponding to the torque exerted on the surface, a corresponding signal voltage is developed across potentiometer 162. This voltage provides a relationship between the servo control voltage and the resulting motor torque to maintain a constant torque for a particular control voltage. Thus, a given control voltage applied to the motor results in given motor torque which is accompanied by a proportional feedback voltage, this torque being based on the difference between control voltage and feedback voltage. Should aging cause the motor torque corresponding to a given control voltage to increase, the feedback voltage also increases to reduce the total servomotor voltage, which results in the motor torque being reduced to the required value.

Under most conditions the torque feedback voltage keeps the motor torque within the required limits. However, as a safety feature, torque limit switches are included in each servo to remove excitation from the servomotor if excessive torque is applied. When the torque exceeds a predetermined amount, one of the switch posts 163 is depressed thereby disengaging the servomotor from the control surface. Stops 164 and 165 are also provided to prevent the servomotor from rotating beyond a limited extent.

The surface actuating units of FIGURES 7 and 8, which are similar, are shown with prime numbers. However, the elevator channel, FIGURE 8, includes an additional amplifier 11''', motor 12''', gear train 13''', and clutch 14''' which operates the trim tab surface to trim the craft in a known manner.

Comparatively slow moving aircraft, which have inherently large aerodynamic damping characteristics, may be controlled satisfactorily by applying to the craft a control action corresponding directly to the extent of deviation of the craft from a reference condition. However, faster aircraft, which have inherently less aerodynamic damping characteristics, also require control with respect to the rate of deviation of the aircraft away from or toward the reference condition to assure a positive return to the reference condition.

The movement of the craft away from the reference condition develops a signal proportional to the degree of displacement, but the initially small signal applies little control action. The rate of deviation, on the other hand, may be quite large, so that the displacement, if continued at this rate, may progress to a considerable extent. By utilizing a rate of turn signal in the system, a tendency for displacement of the aircraft from the reference condition may be immediately opposed by a rate signal tending to reduce toward zero the rate of displacement of the craft. At the time a condition of zero rate is approached, any actual displacement of the craft from reference results in a displacement signal which continues to apply a control action to return the craft to reference.

Upon any displacement, the return to the reference condition is also opposed by the rate of displacement signal; the rate signal opposing the displacement signal on the return to the reference and aiding the displacement signal on the excursion from reference. Thus, any degree of damping of movements of the aircraft can be provided by suitably proportioning the rate and displacement signals. For example, by increasing the magnitude of the rate signal with respect to the displacement signal, the control of the craft can be made as slow or damped as needed.

In the embodiment herein, the rate signals are provided by conventional rate gyroscopes 166, FIGURE 1; 167, FIGURE 7; and 168, FIGURE 8; each measuring the rate of turning of the craft about an axis. The trunnion of a conventional rate gyro presses against springs to an extent proportional to the rate of turning, and this displaces a rotor of an inductive device relative to its stator in a well known manner to develop a signal corresponding to the rate of turning. Thus, rate gyro 166 displaces a rotor 169 relative to stator 170 to develop across a potentiometer 171 a signal corresponding to the rate of turning of the craft about its yaw axis; rate gyro 167 displaces a rotor 172 relative to a stator 173 to develop across a potentiometer 174 a signal corresponding to the rate of turning about the roll axis; and rate gyro 168 displaces a rotor 175 relative to a stator 176 to develop across a potentiometer 177 a signal corresponding to the rate of turning about the pitch axis.

The signal developed across potentiometers 171, 174 and 177 correspond to a rate of angular deviation of the craft from a given position. However, the extent of displacement of the control surface to correct the rate of deviation varies with the indicated airspeed which is a function of dynamic air pressure. While the extent of control surface movement required to produce a given change or rate of change in aircraft attitude decreases as the dynamic air pressure increases, the control surface hinge moment required to move the surface increases and may effect the operation of the servo motor in response to a given signal. Thus, as the dynamic air pressure or indicated airspeed increases, the signal strength of the signal chain on the one hand must be reduced to obtain a reduction in control surface movement for a particular displacement error; and, on the other hand, the signal strength must be increased to compensate for the increase servo motor torque required to compensate for the increase in the surface hinge moment; the relative value of these two effects on the servomotor operation being determined by the peculiarities of the craft. The adjustments of the signal chain as a function of dynamic air pressure (or indicated airspeed) are made by potentiometers to provide for accurate control of the aircraft at all airspeeds; thus, as described before, the wipers of 178, 178′, and 178″ of potentiometers 145, 145′ and 145″ are positioned by motor shaft 191 of airspeed sensor 185.

Airspeed sensor 185, FIGURE 9, may be conventional having an aneroid 186 which, in response to the difference between impact and static pressures, displaces the rotor 187 of an inductive device 189 from a null position relative to the stator 188. The signal developed at stator 188 is applied to an amplifier 189 to operate a motor 190 to drive stator 188 to a new null position. At the same time, the shaft 191 of motor 190 displaces the wipers 178, 178′ and 178″. Shaft 191 also adjusts the wiper 421 of a potentiometer 409 which receives the signal from compass system elements 340, 341, 342.

Lateral accelerometer 196 introduces signals into the rudder channel to coordinate turns at all airspeeds. The lateral acceleration is the acceleration along the bank axis, and roughly corresponds to the skid or side slip of the craft. Hence, if the lateral acceleration is reduced to zero, practically all skid or side slip is eliminated. In a coordinated turn of a craft, the apparent and normal verticals of the craft coincide; and in an uncoordinated turn, the verticals are relatively displaced. During a normal straight flight, the craft also may have a slight slip or skid which may not be detected by the human pilot because ground references are largely lacking at high altitudes. Lateral accelerometer 196, which may be a conventional damped pendulum, responds to this displacement to displace the rotor 197 of an inductive device 198 relative to stator 199 to develop across potentiometer 200 a signal corresponding to the displacement of the normal vertical of the craft from the apparent vertical.

The integration of the lateral acceleration signal with respect to time assures a high degree of turn coordination. To this end the signal from wiper 202 is applied to integrator 203 which comprises an amplifier 209, an induction motor 210, a conventional rate generator 211 and an inductive device 212. In response to a steady state lateral acceleration, the signal from wiper 202 is applied by way of potentiometer 213 to amplifier 209 to operate motor 210. Rate generator 211, when actuated by motor 210, develops across potentiometer 213 a signal corresponding to the rate of operation of the motor to give a good linear response of the motor to the signal. When coil 216 of a magnetic clutch 217 is energized, motor 210 through gear train 214 also displaces the rotor 218 of an inductive device 212 to develop at stator 220 a signal corresponding to the integral of the steady state of acceleration error.

Clutch 217, as well as the other clutches illustrated herein, may be of the type described in U.S. Patent No. 2,407,757. As the clutches are illustrated herein a coil surrounds two clutch faces which are formed of magnetic material; one face is resiliently carried by the motor shaft, and the other face is supported by the shaft of a rotor of an inductive device. Energizing the coil engages the clutch faces; thereafter, any motion of the motor shaft is transmitted to the rotor shaft. Thus, energizing coil 216 of clutch 217 connects motor 210 and rotor 218.

The centering and stop arrangement 215 provided for inductive device 212 may be generally of the type wherein a pair of lever arms 221 and 222, FIGURE 10, are interconnected by a spring 223 and are pivoted to the stator housing on opposite sides of rotor shaft. Projecting between the lever arms is a pin 224 which is mounted on a bracket 225 fastened to the rotor shaft of inductive device 212. When a turning torque rotates the shaft in a clockwise direction, pin 224 will move arm 221 outwardly; and when the torque is removed, that is, when clutch 217 is deenergized and disengaged, spring 223 will return the arm, the pin, and the rotor shaft to neutral position. Counter-clockwise rotation of the shaft causes pin 224 to urge arm 222 outwardly; and when the turning torque is released, spring 223 again returns the shaft to center position. Thus, centering device 21 will maintain rotor 218 at null relative to stator 219 when the clutch 217 is disengaged, and movement of the rotor beyond predetermined limits is prevented by the engagement of a lever 221 or 222 with a stop 226. The stops and centering arrangements hereinafter described and shown in block form in the drawings may be generally similar to that shown in FIGURE 10.

When motor 210 of integrator 208 is drivably connected with inductive device 212, the signal corresponding to the integral of the steady state acceleration error is applied across potentiometer 194. The integration of the displacement errors with respect to time assures accuracy in correcting for displacements from the reference conditions since the integration is the summation of the incremental products of two varying factors; one being the extent displacement of the aircraft from a reference position and the other being the time interval this displacement persists. A persistent displacement may occur if the resulting error voltage is not large enough to overcome the cause of the displacement or if the error voltage is opposed by a voltage from a flight or control surface reference which must be permanently changed to correct the displacement. By integrating the error voltage as a function of the time interval, the integration voltage produced increases the magnitude of the displacement voltage in proportion to the length of time that it persists. Thus, the total voltage eventually reaches sufficient magnitude to completely cancel the cause of the displacement error, and the aircraft is returned to the reference position. Since the integration voltage remains at the last value, permanent compensation is provided for required changes in any of the original flight or control references. At potentiometer 194, the integration voltage is combined with the acceleration signal from potentiometer 200. This signal combination is applied to potentiometer 171.

The yaw channel signal chain from ground 231 to amplifier 11, FIGURE 1, thus includes the series connected signals across potentiometers 200, 194, 171, 145, 124, 162 and 128.

The signal chains for the aileron and elevator control channels include signals developed by inductive devices 288 and 289 which are connected in a known manner to the respective roll and pitch axes trunnions of a vertical gyro 290, FIGURES 7 and 8 and provide the roll and pitch attitude reference. Vertical gyro 290 may be of conventional type, having a rotor universally mounted in normally horizontal inner and outer gimbal rings. The spin axis is continuously erected to a vertical position relative to the earth by a conventional erection system not shown. Since the rotor axis is pivoted about both the roll and pitch axes, the aircraft can pitch or roll while the spin axis remains vertical due to the gyroscopic inertia. The gimbal trunnions, in a well known manner, carry the rotors 294 and 295 of inductive devices 288 and 289 for displacement relative to stators 298 and 299. To maintain the altitude of the craft constant while the craft is turning, as later described, the forward end of the axis of the gimbal which runs parallel with the fore and aft axis of the craft is tilted upwardly from a true horizontal plane.

When energization is supplied to the automatic control system, the various sensors and circuits are placed into operation except clutches 14, 14', 14'' and 14''' which are deenergized and disengaged. Although the system does not control the surfaces, the various circuits and sensors continuously respond to and are synchronized with the instantaneous attitudes of the craft. As a result, the system can be engaged to take over control of the craft smoothly at any time.

During the periods when the system is energized but the craft is under the manual control of the human pilot, the roll and pitch attitudes of the craft may not correspond to the normal attitude of the craft; at this time, synchronizers 300 and 301 maintain the attitude signal output for the automatic control system at a null. Each synchronizer comprises an inductive device 302, 303, a stop and centering mechanism 304, 305, a rate generator 306, 307, an amplifier 308, 309, and an induction motor 310, 311.

The stators 312 and 313 of inductive devices 302 and 303 are connected in parallel with the stators 298 and 299, respectively, of inductive devices 288 and 289 to provide conventional transmitter-receiver arrangements. Each pair of rotors 314, 294 and 315, 295 are normally in positional agreement so that no output develops across potentiometers 320 and 321. A roll attitude displacement, however, destroys the positional agreement of the pair of rotors 294 and 314, and a signal corresponding to the error in position develops across potentiometer 320. Similarly a pitch attitude displacement develops at potentiometer 321 a signal corresponding to the error in positional agreement. During periods of autopilot control, the signals produced in rotors 314 and 315 operate the respective servomotors to return the craft to the correct attitude. During synchronization these signals applied through amplifiers 308 and 309 operate respective motors 310 and 311 to position the associated rotor 314 or 315 at a new null. Rate generators 306 and 307 damp the motor operation to prevent hunting. The energization of coil 322 engages clutch 323 to drivably connect motor 310 and rotor 314, and the energization of coil 324 energizes clutch 325 to drivably connect motor 311 and rotor 315.

The heading of the craft is mainly controlled by operation of the ailerons. Thus, the roll channel includes a heading reference unit comprised of a compass 340, a synchronizer 341, and an integrator 342. Compass 340 may be conventional. The stator 354 of a transmitter inductive device 353 is connected to the stator 355 of a receiver inductive device 356. Transmitter motor 352 is positioned by compass 340 and receiver rotor 358 is positioned by the motor 359 of synchronizer 341. When rotors 352 and 358 are in positional agreement, no output develops at rotor 358 but any relative displacement from this positional agreement develops at rotor 358 a signal output corresponding to the error in position. This signal is applied across potentiometer 360 to provide an input to synchronizer 341, across potentiometer 361 to provide an input to integrator 342, and across potentiometer 362 under certain modes of operation to provide a heading signal to the craft control system.

Synchronizer 341 comprises generally an induction motor 359, an amplifier 363, a rate generator 364, a gear train 365, and a magnetic clutch 366. Magnetic clutch 366, upon energization of coil 367, drivably engages motor 359 with rotor 358. Thereafter, any signal due to rotor 358 not being in positional agreement with rotor 352 will be conducted from wiper 370 of potentiometer 360 by way of lead 373, potentiometer 374 and lead 375 to amplifier 363 whose output operates motor 359 to drive rotor 358 into positional agreement. Rate generator 364 provides a signal across potentiometer 374 to prevent hunting of the motor.

Integrator 342 comprises generally an amplifier 380, an induction motor 381, a rate generator 382, a gear train 383, a magnetic clutch 384, an inductive device 386 and a stop and centering arrangement 387. A signal at potentiometer 361 is transmitted from wiper 388 by way of lead 389, potentiometer 390, and lead 391 to amplifier 380 whose output operates motor 381. The operation of rate generator 382 by motor 381 provides a feed back signal so that motor 381 operates at a speed corresponding to the amplitude of the input signal to amplifier 380. Upon energization of coil 385, magnetic clutch 384 is engaged and motor 381 through gear train 383 drives the rotor 392 of inductive device 386 to develop in stator 393 a signal corresponding to an integral of the error signal at wiper 388. This integral signal is applied across a potentiometer 395.

Potentiometer 395 has one end connected by lead 396 to armature 397 so that under certain modes of operation, later to be described, armature 397 will engage contact 398, and the circuit from wiper 400 of potentiometer 362 is removed from the signal chain, and under other modes of operation armature 397 will engage contact 399 and the heading error signal from wiper 400 will be combined with the integral signal at potentiometer 395. The combined signal from wiper 405 will be coupled by way of a transformer 408 across a potentiometer 409 where the heading error signal is combined with the roll attitude signal. The combined signal at potentiometer 409 is adjusted as a function of airspeed by movement of wiper 421. Potentiometer 409 also has one end connected to an armature 416, which, during some modes of operation, engages a grounded contact 418 and, during other modes of operation, engages a contact 420 that is connected to potentiometer 320. Potentiometer 409 has its wiper 421 connected by lead 423 to armature 430 and lead 431 either by way of lead 424 to contact 425 or by way of lead 426, potentiometer 427, FIGURE 11, and lead 428 to contact 429; armature 430 selectively engaging contacts 425 and 429. Lead 431 is connected to potentiometer 174 across stator 173 of rate gyro 167, and the wiper of potentiometer 174 is connected by a lead 432 to potentiometer 145′ in the aileron motor control unit. Thus, the aileron signal chain from ground to amplifier 11′ normally includes potentiometers 320, 409, 174, 145′, 124′, 162′ and 128′. Amplifier 11′ receives the summation of signals corresponding to the displacement of the craft from a predetermined bank attitude, the heading error and integral thereof, the rate of turn about the roll axis, the displacement of the aileron surface from a normal position, the displacement of the motor shaft from a predetermined position, the torque exerted by the motor, and the rate of operation of the motor.

The pitch control channel, FIGURE 8, includes a conventional altitude control 450 whose aneroid bellows 460 moves in response to ambient pressure. By way of a suitable linkage 461 this bellows movement displaces the rotor 462 of an inductive device 463 relative to stator 464 to develop an output across a potentiometer 465. This output is transmitted from wiper 466 by way of lead 467, potentiometer 468 and lead 469 to amplifier 470 whose output operates a motor 471. Through a suitable gear train 472 the operation of motor 471 positions stator 464 to reestablish a no-signal condition and drives a rate generator 473 to provide a signal across potentiometer 468 to damp the motor operation.

The output of rate generator 473 corresponds to the speed at which stator 464 must be moved to maintain a null condition and, therefore, corresponds to the rate of climb or dive of the craft. This output is coupled by way of leads 474 and transformer 475 across a pair of potentiometers 476 and 477 to provide such a signal for the pitch control channel. Wipers 478 and 479 of these potentiometers are connected to respective contacts 480 and 481 of a relay whose other contacts 482 and 483 are connected to the wipers 485 and 486 of a pair of potentiometers 487 and 488 across the stator 489 of inductive device 490.

The rotor 492 of inductive device 490 is normally centered relative to stator 489 by a centering lever and stop arrangement 491. Upon energization of coil 493, magnetic clutch 494 is engaged to connect rotor 492 and motor 471. Thereafter, any deviation of the craft from the altitude at which clutch 494 is engaged results in a relative displacement of rotor 492 and stator 489 to develop an altitude error signal across potentiometers 487 and 488.

Armatures 496 and 497 selectively engage with contacts 480 and 481 or contacts 482 and 483 to feed the signal corresponding to the rate of altitude displacement or to the altitude displacement to an integrator 498 and to a potentiometer 499. To this end, armature 496 is connected to the integrator amplifier 500 by way of lead 501, potentiometer 502, and lead 503 and armature 497 being connected to potentiometer 499 by way of lead 504.

In response to a signal input, amplifier 500 operates an induction motor 505 which drives a rate generator 507 to develop a signal across potentiometer 502 so as to provide a good linear velocity or rate response of the motor to the input signal. When the coil 508 of a magnetic clutch 509 is energized, the operation of motor 505 by way of a suitable gear train 512 angularly displaces rotor 511 relative to stator 513 to develop a signal corresponding to the integral of the altitude displacement error or rate of altitude displacement signals so that the craft attitude is changed and the altitude error is reduced to zero or the rate of climb is reduced to zero. A stop and centering mechanism 514 maintains rotor 511 and stator 513 centered when clutch 509 is disengaged.

The altitude displacement or rate of altitude displacement signals, and the integral thereof, are combined at potentiometer 499 and applied by way of coupling transformer 515 to a potentiometer 516. Under some modes of operation, an armature 526 connected to potentiometer 516 engages a ground contact 528; and under other modes, the armature engages a contact 530 that is connected by a lead 531 to potentiometer 321. Thus, the pitch attitude signal from inductive device 303 is combined with the altitude or rate of climb signal at potentiometer 516. The wiper 517 of potentiometer 516 is connected by lead 533 to armature 541 and lead 542 either by way of contact 534 and lead 535 or by way of contact 536, lead 537, potentiometer 539, FIGURE 12, and lead 540. These contacts 534, 536 are selectively engaged by the armature 541 which is connected by lead 542 to lead 543 and potentiometer 545; lead 543 being the input to an integrator 544 and potentiometer 545 the output.

Integrator 544 comprises generally an amplifier 555, an induction motor 551, a rate generator 552, a gear train 553, a magnetic clutch 554, and inductive device 556 and a stop and centering arrangement 557. A signal at lead 543 is applied by way of potentiometer 558 and lead 559 to amplifier 555 whose output operates motor 551. Rate generator 552 provides a feed back signal so that motor 551 will operate at a speed corresponding to the amplitude of the signal to amplifier 555. When coil 560 is energized to engage magnetic clutch 554, the operation of motor 551 relatively displaces the rotor 562 and stator 563 of inductive device 556 to develop a signal corresponding to the integral of the signal applied at lead 543. The combined signal from wiper 564 is applied across potentiometer 177 whose wiper is connected to potentiometer 145″ of the elevator power unit.

The armatures 430 and 541 of FIGURES 7 and 8 selectively engage with one of two cooperating contacts when the automatic control system is placed under the control of an instrument landing system. A conventional instrument landing system comprises two main channels: one for localizer or range beams, and the other for glide path beams. Thus, the engagement of armature 430 with contact 429 places the instrument landing system into operation to control the yaw and roll control channels in response to deviations from the localizer or range beams, and the engagement of armature 541 with contact 536 places the instrument landing system into operation to control the pitch channel in response to deviations from the glide path beam.

In a known manner, a conventional localizer or range receiver 601, FIGURE 11, and a glide path receiver 602, FIGURE 12, develop at leads 603 and 604 direct current outputs which correspond in the magnitude and sense to the extent and direction of angular displacement of the craft from a respective beam. In a well known manner, these outputs deflect the needles 607 and 608 of a course deviation meter 605. The polarity of the output, by deflecting needle 607 to the left or right of a center reference, indicates the aircraft position on either side of the localizer beam; and the magnitude of the output, reflected by the extent of needle deflection, indicates the angular distance of the craft from the beam. The horizontal needle 608 is similarly deflected above or below the center reference to indicate the aircraft position relative to the glide path beam.

The direct current signals at leads 603 and 604 are also applied to respective modulators 609 and 610, which may be identical. These modulators develop an alternating current output signal having a phase and amplitude corresponding to the sense and magnitude of the direct current input signal. Each modulator, FIGURE 4, comprises a pair of toroidal cores 611 and 612 of highly permeable magnetic material which have thereon four separate windings: balance windings 613; bias windings 614, 615; primary windings 616, 617; and control winding 618. The primary and bias windings are connected in series opposition. A suitable source of direct current excitation as exemplified by battery 619B is connected to the balance and bias windings 613, 614, and 615; and a suitable source of alternating current excitation is connected to the primary windings 616 and 617. Input terminals 619 are connected to control winding 618 in series with the primary winding 620 of a coupling transformer 621. Also connected across terminals 619 are a pair of grounded capacitors 622 and 623. Terminals 619 of modulator 610 are connected to leads 604 or 603.

Resistors 624 and 625 are adjusted to provide equal saturation for cores 611 and 612. Thus, at a no-signal condition, primary windings 616, 617 induce equal and opposite voltages in the control winding 618; these induced voltages cancel, and no potential develops across the control winding. However, the application of a direct current signal, due to displacement of the craft from the beam, will produce a flux that will tend to subtract from the flux bias of one core 611 or 612 and will tend to add to the flux bias of the other core. The core in which the bias and control fluxes aid each other tends to become more saturated, and thus to become a less efficient transformer. On the other hand, the core in which the fluxes are opposed tends to become less saturated, and thus to become a more efficient transformer. Unequal voltages will be induced in the control winding from the primary windings 616 and 617, and the resultant voltage appearing across primary winding 620 will be coupled by transformer 621 across output terminals 627 and 628 of secondary winding 629. This output will be an alternating current signal corresponding in amplitude and phase to the magnitude and sense of the direct current input to terminals 619. Thus, an input signal to modulators 609 and 610 results in an output corresponding in phase and amplitude respectively to the input supplied by receivers 601 and 602.

In each case, modulator 609 and 610 is one controller of a normally balanced control system 630 or 631 comprising, in addition, an amplifier 632 or 633, an induction motor 634 or 635, a rate generator 636 or 637, a gear train 638 or 639, a magnetic clutch 640 or 641, an inductive device 642 or 643, and a stop and a centering mechanism 644 or 645. Connected across stator 652 of inductive device 642 are three potentiometers 646, 648 and 650; and connected across stator 653 of inductive device 643 are three potentiometers 647, 649 and 651. Thus, the signal chain for control system 630 traced from ground 656 to amplifier 632 includes potentiometer 646, wiper 658, lead 660, secondary winding 629 of modulator 609, lead 662, potentiometer 664, and lead 666. The signal chain for control system 631 traced from ground 657 to amplifier 633 includes potentiometer 647, wiper 661, lead 663, winding 629 of modulator 610, lead 651, potentiometer 665 and lead 667.

The appearance of a signal across secondary winding 629 of either modulator 609 or 610 destroys the balance condition of network 630 or 631. In system 630, FIGURE 11, such signal through amplifier 632 actuates motor 634 which when coil 668 is energized so that clutch 640 is engaged, drives rotor 670 until the signal developed by stator 652 at wiper 658 is equal and opposite to the signal at the secondary winding 629 of modulator 609. The net input signal to amplifier 632 is zero at this time and motor 634 stops with rotor 670 displaced relative to stator 652, and a signal is developed across potentiometer 648 and 650. Rate generator 636 provides a feed back signal to damp the motor operation. The appearance of a signal at winding 629 of modulator 610, FIGURE 12, similarly operates motor 635 of system 631 to displace rotor 671, when coil 673 is energized, relative to stator 653 to develop at wiper 661 a signal equal and opposite to the signal on winding 629. At that time, motor 635 stops, rotor 671 is displaced relative to stator 653 and a corresponding signal is developed across potentiometers 649 and 651. Rate generator 637 damps the motor operation.

The signal from wiper 672 of potentiometer 648, FIGURE 11, is sent to both an integrator 674 and a "wash out" arrangement 676. Similarly, the signal from wiper 675 of potentiometer 649, FIGURE 12, is applied to both an integrator arrangement 677 and a "wash out" arrangement 679. These integrators and "wash out" arrangements may be generally similar.

Integrators 674, 677 comprise generally an induction motor 680, 681, and amplifier 682, 683, a rate generator 684, 685, a gear train 686, 687, a magnetic clutch 688, 689, and inductive signal developing device 690, 691, and a stop and centering device 692, 693. In operation, a beam error signal applied to the amplifier input actuates the motor which drives the rate generator and, when the magnetic clutch is engaged, the inductive signal developing device. The rate generator develops a feed back signal so that the speed of operation of the motor varies linearly with the amplitude of the input signal. When coil 694, FIGURE 11, of integrator 674 is energized and clutch 688 engaged, motor 680 displaces rotor 696 of inductive device 690 relative to stator 698 to develop across potentiometer 700 a signal corresponding to the integral of the beam error. Similarly, the energization of coil 695, FIGURE 12, engages clutch 689, and motor 681 displaces rotor 697 relative to stator 699 to develop across potentiometer 701 a signal corresponding to the integral of the error signal.

"Wash out" devices 676 and 679 each comprise an amplifier 710, 711, an induction motor 712, 713, a rate generator 714, 715, a gear train 716, 717, a magnetic clutch 718, 719, a stop and centering arrangement 720, 721, and an inductive signal developing device 722, 723. The signal from wiper 672, FIGURE 11, is applied to potentiometer 726 and the signal from wiper 675 of FIGURE 12 is applied to potentiometer 727. The signals from potentiometers 726 and 727 are applied to amplifiers 710 and 711, respectively, whose output drives motor 712 or 713. When coils 728 and 729 are energized, these motors displace rotor 730 or 731 relative to stator 732 or 733 and develop a signal across potentiometer 726 or 727 equal and opposite to the signal from potentiometer 648 or 675. Although the net signal at wiper 734, 736 or 737 is zero at this time, the signal which exists due to the relative displacement of the rotor and stator is coupled by transformer 638 or 639 across potentiometer 640' or 641'.

Rate generators 714, FIGURE 11, and 715, FIGURE 12, are driven by motors 712 and 713 to develop across potentiometers 742 and 743 signals corresponding to the rate of motor operation to damp the motor and make the motor operation vary as a linear function of the input signal. These signals are also coupled by transformers 644 and 645 across potentiometers 646 and 647 to provide rate signals for the automatic control system.

Potentiometer 640', FIGURE 11, is connected to potentiometer 650 and potentiometer 641', FIGURE 12, is connected to potentiometer 651. Thus, the signals developed across potentiometers 650 and 651 are applied to potentiometers 640' and 641' where they tend to be cancelled or "washed out" after an interval of time by the signals developed across potentiometers 640' and 641' by inductive devices 722 and 723. This time lag smoothes out spurious beam transients, thereby eliminating rapid variations in the beam signals.

Since the omnirange signal is more erratic than the localizer beam signal, provision is made for changing the "wash out" time so that the omnirange signal is not cancelled as rapidly as the localizer signal. To this end, potentiometer 726, FIGURE 11, is provided with two wipers 734 and 736 which terminate at contacts 750 and 752. Thus, for a given beam error signal, armature 751 will feed a greater or lesser signal to operate motor 712 depending upon the contact engaged. Also, potentiometer 742 across rate generator 714 is provided with two wipers 754 and 756 which terminate at contacts 758 and 760. Thus, armature 759 may feed back a greater or lesser signal portion of the rate generator signal to amplifier 710 so that motor 714 will operate at different rates for the same given error signal.

The short time displacement signals from potentiometers 640 and 641 are coupled by transformers 764 and 765 through limiters 766 and 767 and by transformer 772 or 773 to potentiometer 774 or 775. The limiters may be conventional and identical; and, in the embodiment herein, each comprises a pair of diodes 768 and 769 whose bias is varied by the position of wipers 770 and 771.

The signal for the glide path channel, FIGURE 12, of the instrument landing system includes the summation of the integral signal from potentiometer 701, the rate signal from potentiometer 647, and the displacement signal from potentiometer 775. This signal summation is coupled across transformer 782 to secondary winding 784. Similarly, the signal chain for the localizer channel of the instrument landing system, FIGURE 11, includes the integral signal from potentiometer 700, the rate signal from potentiometer 646, and the displacement signal from potentiometer 774, and, in addition, includes a heading signal from preselector 790; the heading signal being provided so that the craft will head toward the transmitter.

To provide a preset heading, a transmitter inductive device has its rotor 792 positioned by a compass 793 and its stator 794 connected with the stator 795 of a receiver inductive device 796 whose rotor 797 is positioned by a manually operable knob 798, as more clearly described in copending Application Serial No. 490,522, now Patent No. 2,847,633, assigned to the assignee of the present invention. As long as rotors 792 and 797 are in positional agreement, no output develops; but when these rotors are not in positional agreement, an output corresponding to the positional error is developed. This output is applied across a potentiometer 800, and by a coupling transformer 801, across potentiometer 802. One end of potentiometer 800 is connected to potentiometer 803, and its wiper 804 is connected in parallel to potentiometer 800 by way of potentiometer 802 and to an amplifier 806 by way of potentiometer 807.

In response to a signal to amplifier 806, motor 810 operates through gear train and friction clutch 811, and magnetic clutch 812, to displace rotor 814 of inductive device 815 relative to stator 816 to develop a signal across potentiometer 803 equal and opposite to the signal from potentiometer 800. Stop and centering arrangement 817 limits the angular displacement of rotor 814 and maintains rotor 814 centered with respect to stator 816 when coil 818 is denergized, and a feed back voltage from rate generator 820 damps the motor operation. As long as the signals of potentiometers 800 and 803 cancel, the signal fed to potentiometer 700 corresponds to the signal across potentiometer 802. However, when the rotor 814 reaches the limit of device 817, the signal portion across potentiometer 800, which is not cancelled by the signal of potentiometer 803, is added to the signal at potentiometer 802 and the combined signal applied to potentiometer 700 and therefore increases the relative heading signal.

The combined signal from terminal 830, FIGURE 11, is applied to both the aileron and rudder channels. The signal for the aileron channel is coupled by transformer 831 across a limiter circuit 833 whose bias is adjusted by positioning wiper 835, through a conventional filter 837, coupling transformer 838, and an isolation stage comprised of a conventional transistor amplifier stage 840 and coupling transformer 841 to the potentiometer 427 which is connected by leads 426 and 428 to contacts 425 and 429, FIGURE 7, in the aileron signal chain. The signal for the rudder channel is also applied across an isolation stage comprising a conventional transistor amplifier 842 and coupling transformer 844 to a potentiometer 846 which is connected by leads 847 and 848 to contacts 1411 and 1413 in the rudder signal chain.

The combined signal from coupling stage 782, FIGURE 12, is applied across a limiter 850, a filter 851, a coupling transformer 852, and an isolation stage comprised of transistor 853 and transformer 854 to potentiometer 539 in the elevator channel.

Also applied to the elevator channel by way of coupling transformer 855 is a signal which is adjusted by positioning wiper 857 of potentiometer 856 that is connected across a suitable source of alternating current until the signal is just sufficient to cancel the error signal developed in inductive device 303 by the vertical gyro 290 when the craft is at a pitch angle corresponding to the slope of the glide path.

In accordance with the present invention a manually operable controller unit for maneuvering the aircraft by way of the automatic control system is not included because it is believed more advantageous for maneuvers of the aircraft to be executed by the human pilot with the conventional manual control column at which time the automatic control system continues to operate those control surfaces which are not being operated by the conventional control column so that the unaffected reference conditions are maintained and coordination is provided for the maneuvering. Thus, the human pilot banks the aircraft by means of the conventional control column to change the heading. Although the automatic control system disengages from the bank control surface, the automatic control system remains engaged with the pitch and yaw control surfaces to provide proper rudder correction to coordinate the turn and the proper elevator correction to maintain the reference pitch attitude and, if desired, reference altitude. When the turn is established, the human pilot may release the control column and the automatic control system will maintain the turn. Similarly, the control column is used to climb or dive the craft. The automatic control system at this time remains engaged with the bank and yaw surfaces and maintains the reference heading. When the desired climb or dive angle is reached, the pressure on the controller is released and the automatic control system maintains the pitch angle. The craft can be returned to level flight by operating the control column or by operating the level flight switch which automatically holds the aircraft at heading at which the switch was operated and brings the craft to a zero rate of climb.

Turning now to FIGURES 13 and 14, hub 901 of controller 900 is attached to the conventional control column of the aircraft by suitable means not shown. To control the ailerons manually, the human pilot rotates a steering wheel (not shown) which is attached to shaft 902, thereby rotating a pair of shafts 903 which are fixed to shaft 902 and journaled in suitable bushings 904 so as to impart the rotation to a rotatable stop 905 which is journaled in bearings 906 in a housing 907 that is integral wtih hub 901. The rotation of stop 905 is opposed by the compression of springs 908 against brackets 909. These springs are preloaded by retainer and collar clamp 910 to normally center stop 905.

Depending upon the direction of motion of stop 905 the stop will actuate one of the switches 912 after a small angular displacement. This disconnects the roll control channel of the automatic control system from the craft control system in a manner later to be described and enables the pilot to control the aileron linkage. Continued turning of the steering wheel engages one portion 914 against one of the stops 916 fixed to the bracket 909; and the turning movement, thereafter, is transmitted through stop 916 to hub 901. Since this hub is fixed to the manual control column of the craft, the torque is transmitted through the control stick to the aileron linkages and the ailerons. When the pilot releases the pressure on the steering wheel, springs 908 will return the steering wheel to its neutral position.

Pushing the steering wheel forwardly, or pulling it rearwardly, controls the pitch attitude. Four stops 918 and 920 limit the total axial travel of shaft 902. Stops 918, FIGURE 15, are threaded into stop 905 and pass through apertures in shaft 902. Nuts 922 threaded on stop shaft 918 limit the axial movement of shaft 902 with respect to stop 905 in one direction; and stops 920, FIGURE 16, threaded into shaft 902 and locked by nuts 923, engage stop 905 to limit the axle movement of shaft 902 with respect to stop 905 in the opposite direction. The normal axial position of shaft 902 with respect to stop 905 is determined by springs 925 which abut spring retainers 926 threaded onto a shaft 927. A pair of switches 930 are spaced between switch actuators 933 fastened by suitable means to shaft 902.

To control the elevators the human pilot applies a force to the steering wheel longitudinally of the axis of shaft 902. When this force overcomes the preloading on springs 925, shaft 902 will move longitudinally, bushings 904 serving to reduce the friction due to linear motion. Actuators 933, fixed to shaft 902, thus move backwardly or forwardly with the shaft to actuate one of the switches 930 so that the elevator channel of the control system is disconnected in a manner later to be described.

Continued longitudinal movement of the steering wheel will engage shaft 902 with one of the pairs of stops 918 or 920. If the movement is in a forward direction, stop 920 will bear against stop 905 and transmit the force to housing 907 through bearing 906 and to hub 901, thence to the elevator linkages. If the human pilot pulls rearwardly on the steering wheel, shaft 902 will engage nuts 922 and transmit this pull from stop 905 through bearings 906 to housing 907, hub 901, and the manual control column. When the human pilot releases the pressure on the steering wheel, preloaded springs 925 will return the steering wheel to the normal centered position. Thus, by applying a push or pull or a rotation to the steering wheel, the human pilot is able to disconnect a channel of the automatic control system from control of the craft surfaces and control the surfaces manually. Upon release of the steering wheel, the wheel is automatically centered, and the control channel reengaged.

Considering now the switching arrangement, FIGURE 17, alternating and direct current excitations from suitable sources (not shown) are supplied by conventional means (not shown) to the various gyro motors and amplifiers, when the control system is turned "on." Direct current by conventional means (not shown) is also applied to terminals 1002 and 1004; terminal 1002 being positive and terminal 1004 negative with respect to a neutral terminal 1006.

When the control system is turned "on," the energization of clutch coil 367 of compass synchronizer 341, FIGURE 7, from terminal 1004 by way of leads 1007 and 1008 engages clutch 366 so that motor 359 can maintain rotor 358 of inductive device 356 in positional agreement with rotor 352 of inductive device 353. Coils 322 and 324 of the bank and pitch synchronizer clutches 323 and 325, FIGURES 7 and 8, are also energized by way of lead 1007, contact 1011, armature 1012, and lead 1013, so that the rotors of inductive devices 314 and 294 in the roll channel and 315 and 295 in the pitch channel are maintained in positional agreement.

Switch arm 1017, for engaging the autopilot system with the craft, may be of the type which is spring biased to an "open" position described in copending application Serial No. 333,711, now Patent No. 2,734,963 assigned to the assignee of the present invention. In the embodiment herein, a solenoid 1018 is energized when the switch arm is moved to a closed circuit position to hold the switch there and permit the automatic control system to be maintained engaged to control the craft surfaces. A normally closed release switch 1019, however, may be opened to break the circuit from terminal 1002 to solenoid 1018 and disengage the system from control of the craft.

Connected in parallel with solenoid 1018 is a relay 1022 which, when energized, pulls its armatures 1026 and 1028, 1029, 1012 downwardly from the position shown. The engagement of armature 1026 and contact 1031 connects positive terminal 1002 to bus 1032; the engagement of armature 1028 and contact 1033 connects neutral terminal 1006 and bus 1034; and the engagement of armature 1029 and contact 1035 connects the negative terminal 1004 and bus 1036. The disengagement of armature 1012 and contact 1011 and the engagement with contact 1038 places the excitation of the bank and pitch synchronizer clutch coils 322 and 324 under the control of contact 1154 and armature 1153 of relay 1100.

The rudder, aileron, elevator and elevator trim clutches 14, 14′, 14″ and 14‴ are connected between bus leads 1032 and 1036. The connection of these bus leads to terminals 1002 and 1004 directly energizes coil 108 of the rudder servo clutch 14, thereby drivably connecting the rudder servomotor and the rudder control surfaces. The energization of the coils 108′ and 108″ for the aileron and elevator servomotors, however, depends upon the position of shaft 902, FIGURE 14, of manual controller 900 with respect to a central position for those channels.

If shaft 902 be not in a centered position with respect to its angular travel, a switch 912 is moved to an open circuit position. Relay 1039 will not be energized and its armatures will be in the positions illustrated in the drawing. The engagement of armature 1067 and contact 1068 energizes motor 310 of bank synchronizer 300 to maintain the rotors of inductive devices 288 and 302 in positional agreement. The engagement of armature 416 with contact 418 removes the vertical gyro roll pick off from the signal chain to amplifier 11′.

If shaft 902 be centered with respect to its angular travel, switches 912 are in a closed position. The solenoid of a relay 1039 will be energized by a circuit from bus 1032 to bus 1036 through lead 1040, switches 912, relay 1039 and lead 1041 and its armatures will be moved downwardly from the position shown. The engagement of armatures 1045 and 1046 with contacts 1047 and 1048 energizes coil 108′ to drivably connect the aileron servomotor with the aileron surfaces. The disengagement of armature 1067 and contact 1068 deenergizes the fixed phase winding of the synchronizing motor 310, FIGURE 7, to prevent the motor from drifting. The disengagement of armature 416 and contact 418 and the engagement with contact 420 connects the roll attitude signal into the aileron signal chain. The engagement of armature 1070 and contact 1071 energizes a relay 1072 by way of either of two parallel circuits: one circuit being from bus 1032, armature 11076 of a relay 11077, contact 1081, contact 1080 of relay 1305 and armature 1074; and the other circuit being from bus 1032, armature 1150 and contact 1151 of relay 1100.

Upon the energization of relay 1072, its armatures 1075, 1077 and 397 move downwardly from the position shown. The disengagement of armature 1075 and contact 1076 deenergizes the fixed phase winding of the compass synchronizer motor 359, FIGURE 7, and the engagement of armature 1077 with contact 1078 energizes the fixed phase winding of the heading intergrator motor 381. The disengagement of armature 397 from contact 398 and the engagement with contact 399 inserts the heading displacement signal from potentiometer 362 into the aileron signal chain.

If the manual controller be centered, with respect to a fore and aft axis, switches 930 are in a closed position and provide a circuit from bus 1032 to energize relay 1066 so that its armatures are moved downwardly from the positions shown. The engagement of armatures 11081 and 1082 with contacts 1083 and 1084 completes a circuit through coils 108″ and 108‴ to drivably engage the elevator and trim servomotors with the elevator and trim surfaces. If either switch 930 be moved to an open circuit position, however, relay 1066 is deenergized and the movement of the armatures to the position illustrated in the drawing deenergizes coils 108″ and 108‴ and the elevator and trim servomotors are disengaged from its surface.

Considering the action of the other armatures of relay 1066 when the relay is energized, the engagement of armature 1086 with contact 1087 completes a circuit from bus 1036 to bus 1034 to energize coils 560 and 508 of the pitch attitude and pitch altitude integrators. Motors 551 and 505, FIGURE 8, can displace rotors 562 and 511 relative to stators 563 and 513 of inductive devices 556 and 510 to develop across potentiometers 545 and 499 signals corresponding, respectively, to the integral of the pitch attitude error signal, and to the integral of the altitude displacement or rate of displacement signal from the altitude controller 450. The engagement of armature 1065 and contact 1099 completes the excitation path to the level flight switch arm 1140. The engagement of armature 1095 with contact 1096 permits direct current to be supplied to the altitude control switch arm 1110 from bus 1032 by way of lead 1097, armature 1098 and contact 1099 of relay 1066, lead 1101, lead 1102, armature 1103 and contact 1104 of relay 1502 and lead 1108. The disengagement of armature 1116 and contact 1117 removes the excitation from the fixed phase winding of pitch synchronizer motor 311, FIGURE 8, to stop the motor and fix the position of rotor 315 of inductive device 303 with respect to stator 313. The disengagement of armature 526 from contact 528 and its engagement with contact 530 inserts the pitch attitude signal from potentiometer 321 into the pitch signal chain.

The moving of switch arm 1110 to a closed circuit position energizes solenoid 1112 to hold this position and control 450 maintains the craft at constant altitude. Also energized is a parallel connected relay 1130 whose armatures 1131 and 1136 move downwardly from the position shown. The engagement of armature 1131 and contact 1132 energizes coil 493 of clutch 494, FIGURE 8, thereby engaging clutch 494 so that motor 471 can displace the rotor 492 of inductive device 490 relative to stator 489 as it drives stator 464 to a null. This develops across potentiometers 487 and 488 signals corresponding to any deviation of the craft from the altitude at which clutch 494 is engaged. The engagement of armature 1136 and contact 1139 energizes the fixed phase winding of integrator motor 505.

Moving switch arm 1140 to a closed circuit position energizes solenoid 1092 to hold this position and energizes relay 1100 which moves its armatures downwardly from the position shown to place the craft in a level flight attitude. The engagement of armature 1150 with contact 1151 energizes relay 1072 through contact 1071 and armature 1070. The disengagement of armature 1153 from contact 1154 removes the excitation from contact 1038 of relay 1022 and deenergizes clutch coils 322 and 324. The disengagement of armature 1158 from contact 1160 removes the excitation from armature 1131 and deenergizes coil 493 of altitude control 450. The disengagement of armature 1162 from contact 1163 opens the circuit to the holding solenoid 1401 for switch arm 1056. The disengagement of armature 1221 from contact 1222 deenergizes the holding solenoid 1112 so that switch arm 1110 is moved to an open circuit position but the engagement with contact 1253 provides direct current to energize relay 1130. The altitude control switch arm 1110 is also deenergized by the disengagement of armature 1098 from contact 1099 opening the circuit from bus 1032 to the switch arm through lead 1101, armature 1095, contact 1096, lead 1102, armature 1103, and contact 1104. The engagement of armature 1098 with contact 1260 energizes both a relay 1261 through armature 1264 and contact 1263 and a conventional thermal time delay device 1265 through armature 1266 and contact 1267.

Relay 1261 and delay device 1265 form a timing arrangement for a rate of climb cycle. Armatures 496 and 497, FIGURE 8, of relay 1261 move downwardly to engage contacts 480 and 481 and provide a rate of altitude displacement signal to the elevator channel as shown in FIGURE 8. The engagement of armature 1270 and contact 1272 excites contact 1253 of relay 1100 to energize relay 1130. After a predetermined length of time set by device 1265, armature 1273 of time delay relay 1261 engages contact 1274 to energize a holding relay 1275 whose armatures 1264 and 1266 move downwardly from position shown. The engagement of armature 1266 and contact 1276 provides a holding circuit for energizing relay 1275; the disengagement of armature 1264 and contact 1263 deenergizes relay 1261 to return armatures 496 and 497 to the position shown; and the disengagement of armature 1266 from contact 1267 deenergizes time delay relay 1265, opening the circuit between armature 1273 and contact 1274.

The frame which mounts the spin axis of the vertical gyro 290 also has a semi-circular mercury switch 1300, mounted on it parallel with the roll axis of the craft. Since this frame has a fixed position in space due to the gyroscopic inertia, the mercury globule 1301 of the switch is free to move and follows the dynamic vertical of the aircraft. When the displacement between the dynamic vertical and the true vertical exceeds a predetermined amount, the mercury globule engages terminal 1302 or terminal 1303 and completes a circuit to a bank angle relay 1305 whose armatures 1063 and 1074 move downwardly from position shown. The disengagement of armatures 1074 from contact 1080 deenergizes one path of excitation to contact 1071 of relay 1039 and the disengagement of armature 1063 from contact 1064 removes one of the parallel branches of excitation for switch arm 1140 via armature 1065 and contact 1090.

Moving switch arm 1056 to a closed circuit position engages the flight path computer for controlling the craft in response to a range beam of relay 1039 is energized so that armature 1053 and contact 1054 are in engagement; and both the switch arm holding solenoid 1401 and relay 11072 will be energized providing that relay 1092 is deenergized so that contact 1163 and armature 1162 are engaged. Relay 11072 upon being energized, moves its armatures downwardly from the position shown. The disengagement of armature 430 from contact 425 and the engagement with contact 429 and the disengagement of armature 1410 from contact 1411 and the engagement with contact 1413 places the signal from the localizer computer section into the roll and yaw channels. The engagement of armature 1420 and contact 1421 supplies excitation to coils 668, 723, 694 and 818 to place the computer into operation. The disengagement of armature 1442 and contact 1443 opens the circuit to holding solenoid 1092 so that if the level flight switch be engaged, it is released. The disengagement of armature 11076 and contact 1081 and the engagement with contact 1445 removes the excitation from contact 1080 of relay 1305 and provides excitation to armature 1416 of relay 1458.

When the radio in the craft is tuned to the localizer beam, switch arm 1457 is moved to a closed circuit position by a suitable means (not shown), thereby energizing relay 1458 so that its armatures move downwardly. The disengagement of armatures 751 and 759 from contacts 750 and 758 and the engagement with contacts 752 and 760 changes the "wash out" rate of circuit 676, FIGURE 11. The engagement of armature 1416 and contact 1481 excites glide path switch arm 1482 so that the glide path computer section can be placed into operation.

After the receiver has been tuned to the localizer frequency, the moving of arm 1482 to a closed circuit position energizes holding solenoid 1500 to hold the arm in this position and a relay 1502 to move its armatures downwardly. If the constant altitude switch arm 1110 be in a closed circuit position, the disengagement of armature 1103 and contact 1104 opens the circuit to the switch arm and the arm moves to an open or "off" position. The disengagement of armature 541 from contact 534 and its engagement with contact 536 places the glide path error signal into the elevator signal chain. The engagement of armature 1510 with contact 1511 energizes solenoids 673, 695, 729 and 1600 to place the glide path channel of the instrument landing system into operation. The engagement of armature 1521 and contact 1524 provides excitation to keep relay 1066 energized although switch 930 be moved to open position. The engagement of armature 11521 and contact 11524 provides excitation to keep relay 1039 energized although either switch 912 be moved to open position.

To place the automatic steering system into operation, the human pilot turns the master switch of the craft (not shown) to an "on" position, and supplies the alternating current source (not shown) to the system from a suitable source. The direct current which is generated by suitable means on the craft has a polarity at terminal 1002, FIGURE 17, positive and terminal 1004 negative with respect to neutral terminal 1006.

During the time the human pilot controls the craft manually, the various sensors and circuits of the system are operable to respond to the maneuvering of the aircraft. However, the system does not operate the control surfaces, because of the open circuit for the clutches between the servomotors and the control surface rigging. The operation of the circuits before the system is engaged continuously synchronizes the system with the instantaneous configuration of the aircraft and reduces the servo control voltages to null. Thus, the automatic control system is continuously maintained in synchronism with the movements of the aircraft.

When the craft is placed under control of the automatic system, the input to the yaw channel amplifier 11, FIGURE 1, includes the summation of the signals across potentiometers 202, 194, 171, 145, 124, 162 and 128; the input to aileron channel amplifier 11', FIGURE 7, includes the summation of the signals across potentiometers 320, 409, 174, 145', 124', 162'; and 128'; and the input to the elevator channel amplifier 11", FIGURE 8, includes the summation of the signals across potentiometers 321, 516, 545, 177, 145", 124", 162" and 128". The signal to trim tab amplifier 11''' includes the torque signal coupled across potentiometer 2000 by transformer 2001.

Before the automatic pilot system is placed into control of the craft, the relays of FIGURE 17 are deenergized and the armatures are in the position shown. The integration signals across potentiometers 395, 545, 499 and 194 are maintained at zero; inductive device 386 of the heading integrator 342, inductive device 556 of pitch attitude integrator 544, inductive device 510 of altitude integrator 498, inductive device 212 of lateral accelerometer integrator 203, and inductive device 492 of altitude control 450 are maintained at null by their centering levers due to the clutches connecting the respective inductive devices with their driving motor being disengaged. The synchronizing systems 341, 300 and 301 maintain the signal at zero across potentiometer 360, 320 and 321, respectively.

In synchronizing system 341, FIGURE 7, coil 367 of clutch 366 is energized from terminal 1004 by way of lead 1008, FIGURE 17, so that motor 359 is drivably connected with rotor 358; and alternating current is supplied to the fixed phase winding of motor 359 by way of armature 1075 and contact 1076 of relay 1072. Thus, a signal at wiper 370 resulting from an error in position of rotors 358 and 352 operates motor 359 to drive rotor 358 to a position to reduce the signal to zero.

Similarly, in synchronizing systems 300 and 301 direct current from terminal 1004 by way of contact 1011 and armature 1012 energizes the coils 322 and 324 of clutches 323 and 325 so that motors 310 and 311 are drivably connected with rotors 314 and 315. Alternating current is supplied to the fixed phase of motor 310 by way of armature 1067 and contact 1068 of relay 1039 and to motor 311 by way of armature 1116 and contact 1117 of relay 1066. Thus, if the rotor positioned by a motor is not in agreement with the rotor positioned by the gyro, the error signal operates the motor to drive the rotor to a position to cancel the signal.

Since surface position transmitters 17, 17' and 17" are connected by linkages 141, 141' and 141" at all times to the control surfaces, any displacement of a craft's surface manually from its normal streamlined position displaces a respective rotor 140, 140' or 140" of inductive device 17, 17' or 17", relative to stator 143, 143' or 143", to develop across potentiometer 145, 145' or 145" a corresponding signal which will be transmitted to the respective amplifier input.

Also, the displacement of the surface may cause a rate of turn of the craft about an axis and develop a signal across the rate gyro. In the rudder channel, for example, a rate signal may be developed across potentiometer 171. Further, the dynamic vertical and the normal vertical may not coincide and a corresponding signal may be developed across potentiometer 200. These combined signals will be applied through amplifier 11 to operate motor 12 until the displacement of rotor 120 of the shaft position transmitter 15 relative to stator 123 develops an equal and opposite signal across potentiometer 124, reducing the net signal input to amplifier 11 to zero and stopping the motor. Rate generator 16 provides a signal across potentiometer 128 to damp the motor operation. Thus, the signal chain to amplifier 11 is maintained in a balanced or zero condition as long as the control system is not engaged with the surfaces. The input to the amplifiers 11' and 11" of the other channels is similarly maintained at a zero value. The torque of the motor is substantially zero, so no signal develops at potentiometer 2000, FIGURE 8.

Thus, the heading information, barometric altitude information, and pitch and bank angle output is continuously synchronized to provide voltages which are null at system engagement but which then change in proportion to any subsequent changes in the heading, pitch and bank angles. Since the system includes a feature for automatically bringing the aircraft to level flight when desired, voltages representing the instantaneous bank and pitch angles are also required and both of these voltages are supplied by the bank and pitch devices 288 and 289 on the vertical gyro, in conjunction with their synchronizers 300 and 301. The synchronizers continuously cancel the pitch and bank vertical gyro voltages to null until the autopilot system is engaged, then operating so that any change in pitch or bank angles develops a corresponding signal. The relaying system, FIGURE 17, selects between the pitch and bank signals representing displacements from the pitch and bank attitude at system engagement, and the pitch and bank signals representing displacements from the pitch and bank attitudes at level flight.

Under normal conditions the ailerons are substantially streamlined when the automatic pilot system is engaged. Depending upon the loading of the aircraft and the resultant elevator trim, however, the elevators may not be streamlined. Since surface position follow-up 17 is connected to each surface, signals corresponding to surface displacements from the streamline position are presented to the system, and the sum of the various voltages developed in each channel operates a corresponding servomotor to position a motor position follow-up, such as 15, to position the motor to reduce the input to the servoamplifier to null. Hence, upon engagement of the system and surface the control voltages are initially null.

Since the signal chain is at zero, the automatic control system can be smoothly engaged in any attitude to control the craft by moving switch 1017, FIGURE 17, to a closed circuit position, thereby energizing holding solenoid 1018 to maintain the switch arm in a closed circuit position and energizing relay 1022. If switch 1019 be moved to an open circuit position at any time, it will break this circuit and disengage the automatic control system, deenergizing solenoid 1018 and permitting switch arm 1017 to move to an open position.

Relay 1022, upon energization, moves its armatures downwardly from the position shown. The engagement of armature 1026 and contact 1031 energizes bus 1032 with positive direct current; the engagement of armature 1028 and contact 1033 connects the neutral or ground terminal 1006 to bus 1034; and the engagement of armature 1029 and contact 1035 energizes bus 1036 with negative direct current. In addition, the disengagement of armature 1012 from contact 1011 and its engagement with contact 1038 places the energization of the coils 322 and 324 of synchronizers 300 and 301 under the control of armature 1153 and contact 1154 of relay 1100.

If the autopilot be engaged with the aircraft in a sideslip or skid, the sum of all the rudder channel signals is null so there would normally be no corrective action. However, the portion of the signal from potentiometer 200 fed to the integrator amplifier 209 starts motor 210 operating at system engagement to generate at inductive device 212 a voltage which is proportional to the product of the magnitude of the skid or sideslip and the length of time it exists. Thus, this builds up as the uncoordinated turn persists to operate motor 12 to reduce this condition.

When the integration signal from inductive device 212 has changed the rudder position sufficiently to obtain a coordinated turn, the voltage from the dynamic vertical sensor is reduced to null but the integration signal remains at the value required to cancel the servo and surface position follow-up signal voltages which correspond to the new rudder position. Coordinating of the turn changes the rate of turn so the yaw rate signal changes to prevent the coordination of the turn but this opposing voltage is also cancelled by the integration voltage.

The engagement of the aileron or elevator servomotors with their respective surfaces depends upon the position of shaft 902 of the manual controller, FIGURE 14. Rudder servo clutch coil 108, however, is energized to drivably connect the rudder servomotor with the rudder surface as soon as the bus bars 1032 and 1036 are energized. Clutch coil 216 of the lateral accelerometer integrator is also energized to connect motor 210 and rotor 218 when armature 1029 engages contact 1035. The signal chain at the rudder servo amplifier 11 at this time includes the signals across the series connected potentiometers 200, 194, 171, 145, 124, 162 and 128.

The aileron servomotor 12′ will be engaged with the aileron surface, if shaft 902, FIGURE 14, be centered with respect to its angular position. Switches 912 will be in a closed circuit position, and relay 1039 will move its armatures downwardly from the position shown.

The engagement of armatures 1045 and 1046 of relay 1039 with contact 1047 and 1048 energizes clutch coil 108′ to connect servomotor 12′ with the aileron surface. The engagement of armature 1053 and contact 1054 completes a direct current from bus 1032 to switch arm 1056; thereafter, the localizer channel may be placed into operation by moving the switch arm to a closed circuit position. The disengagement of armature 1067 and contact 1068 deenergizes the fixed phase winding of bank synchronizer motor 310; this fixes the position of rotor 314 of inductive device 302 relative to rotor 294 and any bank displacement of the craft thereafter displaces rotor 294 of inductive device 288 relative to rotor 314 to inductive device 302 to develop a corresponding roll attitude signal across potentiometer 320. The disengagement of armature 416 from contact 418 and its engagement with contact 420 connects this signal into the aileron signal chain. The engagement of armature 1050 with contact 1051 energizes coil 385 to connect motor 381 with rotor 392 of inductive device 386 to place the heading integrator 342 into operation. The engagement of armature 1070 and contact 1071 energizes relay 1072; contact 1071 being excited either by way of armature 1074 or armature 1151.

The armatures of relay 1072 move downwardly from the position illustrated upon energization of the relay. The disengagement of armature 1075 and contact 1076 stops the operation of the compass synchronizer motor 359 by deenergizing the fixed phase winding of the motor. This fixes the position of rotor 358 of inductive device 356, and any displacement of the craft thereafter from this heading displaces rotor 352 of inductive device 353 relative to rotor 358 of inductive device 356 to provide a heading error signal across potentiometer 360, 361 and 362. The disengagement of armature 397 from contact 398 and the engagement with contact 399 places the signal from potentiometer 362 into the aileron signal chain. The engagement of armature 1077 and contact 1078 energizes the fixed phase winding of motor 381. Thereafter, the motor will respond to a signal from potentiometer 388 and displace rotor 392 to develop a signal corresponding to the integral thereof across potentiometer 395.

If the craft be in straight and level flight at the time the automatic control system is engaged, the control system will keep the craft at this attitude and heading. Any displacement of the craft in roll displaces rotor 294 relative to rotor 314 to develop across potentiometer 320 a corresponding attitude signal. Any displacement of the craft from the heading at which the fixed phase winding of motor 359 of the heading synchronizer is deenergized, develops a corresponding heading error signal across potentiometers 361 and 362.

The signal from potentiometer 362 is applied across coupling transformer 408 to potentiometer 409 where it is added to the bank attitude signal and applied by way of potentiometer 174 to the amplifier 11′. Depending upon the phase of the signal, motor 12′ operates in a clockwise or counter-clockwise direction to displace the aileron surface control system until the signal across potentiometer 124′ resulting from the displacement of rotor 120′ becomes equal and opposite to all other signals applied to amplifier 11′. The net input signal to amplifier 11′ at this time is zero, and the motor stops with the surface control system displaced. As the displaced system applies a torque to the main surface, the main surface becomes displaced and develops a signal across potentiometer 145′ to equal and oppose the attitude, heading, and servo position signals. The signal at amplifier 11′ then operates motor 12′ in a direction to return the control system to its normal position.

As the displaced main control surface causes the craft to return to the roll attitude at which the fixed phase winding of motor 310 was deenergized, the attitude signal decreases and the signal across potentiometer 145′ prevails to operate motor 12′ to return the surface to its normal position. The movement of the craft about the roll axis develops a rate of roll signal across potentiometer 174 which opposes the return to and displacement of the craft from reference so that the inertia of movement will not cause the craft to over-shoot the desired reference position.

Should the craft not be flying in a straight and level condition at the time the automatic control system is engaged with the control surfaces, the initial engagement will still be smoothly accomplished since the signal chain is maintained at null due to the self-synchronizing arrangement previously discussed.

If the automatic pilot system be engaged when the bank angle of the aircraft is less than a predetermined angle, such as eight degrees, it is assumed that the engagement heading is to be maintained rather than the engagement bank angle. Thus, the system is designed to lead the craft automatically to maintain the engagement heading. If one wing be lower than the other and the craft not be in a turn, the lateral accelerometer 196 will develop across potentiometers 200 a signal corresponding to displacement of the normal vertical of the craft from the vertical due to gravity. The signals from potentiometer 200 and from inductive device 219 are combined at potentiometer 194, and the combined signal is applied through amplifier 11 to operate the rudder servomotor 12 to displace the rudder control; the craft will commence to turn. The signal corresponding to the displacement of the verticals is applied to amplifier 209 of the integrator 203 to cause motor 210 to displace rotor 218 of inductive device 212 relative to stator 220 and develop across potentiometer 194 a signal corresponding to the time integral of the error.

At the instant the system is engaged, the sum of the voltages to the aileron servo amplifier 11' is null; heading synchronizer 341 stops operating so that any further change in heading now produces an error signal and gyro synchronizer 300 stops operating so that any change in the bank angle from that at system engagement produces an error signal. Hence, any change from the conditions at system engagement results in error voltages.

The change in heading will cause a relative displacement in the positions of rotors 352 and 355 developing a heading error signal across potentiometers 361 and 362. The signal at potentiometer 362 will by way of contact 399, armature 397, and potentiometer 395 be coupled across transformer 408 and operate the aileron servomotor 12' to lift the wing and level the craft. The change in the shaft position of motor 12' and the change in the position of the ailerons produces signals from the servo position and surface position follow-ups 15' and 17' which oppose this action. Also since the heading error voltage has displaced the ailerons, the aircraft starts to level off. Opposition to the heading error signal now comes from the no-longer synchronized bank inductive device 302 whose signal output increases as the change from the bank angle at system engagement increases. Rate gyro 167 also develops across potentiometer 174 a voltage having an amplitude proportional to the rate of change of bank angle to oppose the change in bank angle and to damp the maneuvering of the aircraft.

Initially, the heading error signal, which continues to increase, is larger than the sum of the other signals and increases the aileron displacement until the bank angle of the aircraft changes sufficiently to make the combination of the bank error and surface and servo position follow-up signals larger than the still increasing heading error signal; and the larger signal prevails to operate the servomotor 141 towards a streamline position. The banking of the craft continues at a decreasing rate, while the heading error continues to increase, but also at a decreasing rate. Thus, the craft is soon brought into a wings level attitude with the ailerons returned to streamline position, the heading signal at a constant value, the surface follow-up signal at null and the rate gyro signal at null, and the servo position follow-up voltage at null if the ailerons were streamlined at system engagement. Were the ailerons not in a streamlined position at system engagement, the servo position follow-up signal was equal and opposite to the surface position follow-up signal which resulted from the displaced ailerons at that time. Since the ailerons are now streamlined, the servo position follow-up voltage has a magnitude equal to its original magnitude plus a magnitude which is proportional to the difference between the servo output shaft position at system engagement and the servo output shaft position corresponding to a streamlined position. Thus, a signal existing at the servo position follow-up 15', if the ailerons were not streamlined at system engagement, reflects the aileron displacement which existed at engagement, and a signal existing at inductive device 302 has a value equivalent to the change in bank angle from that at system engagement.

For the signals at amplifier 11' to be at null when the aircraft has been brought to level flight and to a constant heading, an error from the heading at system engagement would normally be required to provide a heading error voltage to cancel the bank attitude and servo position follow-up signals.

In order to correct for the heading error a portion of the heading error signal at inductive device 356 is passed to integrator circuit 342. To this end, the signal at potentiometer 388 is applied through amplifier 380 to operate motor 381 to actuate inductive device 386 to develop across potentiometer 395 a signal proportional to the heading error. This signal, being proportional to the heading error multiplied by the length of time that the error persists, builds up as the aircraft hangs off the engaged reference heading and operates aileron servo motor 121 to bring the aircraft slowly back to the reference heading.

The heading error integration signal thus aids the heading error signal in opposing the servo position follow-up signal and the bank attitude error signal. When the heading integration signal has returned the aircraft to the reference heading, the heading error voltage is reduced to null. The heading error integration signal, however, remains at the value required to keep the aircraft at the reference heading, i.e., to balance the bank error signal and the servo position follow-up signals.

The craft will now be flying at level attitude on the course at which the automatic control system was engaged. The signals from the dynamic vertical sensor 196 and from the compass synchronizer 341 will be at null, and the crab angle of the craft, if any, will be a minimum for the power required to fly the aircraft. Any deviation from this attitude develops signals to correct for the deviation. Assume, for example, that a wing tilts over. Upon the rolling of the wing, the rate gyro 167 develops a signal proportional to the rate at which the aircraft is rolling to operate motor 12' to oppose this roll. The "anticipatory" action of the rate gyro starts the correction for the roll before the bank angle becomes large and is aided by the signal from inductive device 302 which is proportional to the magnitude of the displacement. Thus, the rate of roll is reduced by the displaced ailerons and the rate of roll signal becomes smaller. The displacement of the ailerons from the streamline position is opposed by the surface position and servo posion follow-up signals. The displaced ailerons stop the roll of the craft and starts to return the craft towards the level condition. The rate gyro signal now opposes the bank attitude signal and aids the surface position and servo position follow-up Autosyn voltages to return the ailerons to streamline. Thus, as the bank attitude returns towards zero, the bank attitude signal gets smaller; and the craft assumes a level condition with the ailerons streamlined, and the sum of all signals to amplifier 11' reduced to null.

Should a displacement from the reference heading due to banking occur, the resulting heading error at inductive device 356 operates motor 12' to return the craft to the reference heading. On the other hand, if the heading deviation arises because of a gust turning, the nose of the craft, the major action in preventing a large error from resulting is applied by the rudder control channel. The aileron control channel then provides the turn to bring the aircraft back to the reference heading.

If a wind condition or loading requires a permanent aileron displacement from the streamline position to maintain the reference heading, the heading integration signal builds up to cancel the servo position and surface position follow-up signal, which oppose the necessary change in aileron position, and the bank attitude signal, which opposes the change in bank angle. Thus, the heading integration signal provides the necessary control to automatically maintain the aircraft at the reference heading regardless of changes in loading, wind conditions, etc.

Should a change in the heading or the bank angle of the craft be desired, the human pilot angularly displaces the manual controller 900 (FIGURES 13 to 16). The movement of shaft 902 of the manual controller to the right or left of center will move one switch 912 to an open circuit position and deenergize relay 1039. The resulting disengagement of armatures 1045 and 1046 from contacts 1047 and 1048 deenergizes clutch coil 108' and disconnects servomotor 12' from the aileron surface control. Upon further movement of the shaft 902, the aileron surfaces will be controlled directly by the conventional mechanical linkages (not shown) extending from the manual controller hub 901 to the control surface.

The input to amplifier 11' is maintained at null during the period of manual operation. The engagement of armature 1068 and contact 1067 of relay 1039 energizes the fixed phase winding of the bank synchronizer motor 310 so that rotor 314 of inductive device 302 will be positioned in agreement with the rotor 294 of inductive device 298 that is positioned by the bank axis of vertical gyro 290. The disengagement of armature 416 from contact 420 and the engagement with 418 removes the bank attitude signal from the signal chain. The disengagement of armature 1050 from contact 1051 deenergizes coil 385 of clutch 384 and centering levers 387 return the rotor 392 of inductive device 386 to null. The disengagement of armature 1070 from contact 1071 deenergizes relay 1072.

The disengagement of armature 397 of relay 1072 from contact 399 and the engagement with contact 398 removes the heading error signal from the signal chain, and the disengagement of armature 1077 from contact 1078 deenergizes the fixed phase winding of heading integrator motor 381 and stops the operation of the motor. The engagement of armature 1075 with contact 1076 energizes the fixed phase winding of compass synchronizer motor 359 so that rotor 358 is positioned in agreement with the rotor 352 that is positioned by the compass.

As long as the automatic control system is engaged, the rudder is automatically operated to coordinate the turns. Thus, while the ailerons are being controlled manually, the rudder and elevators are being controlled automatically: the rudder operation automatically coordinating turns and damping oscillations about the flight path; and the elevator operation automatically maintaining constant pitch attitude or altitude.

As the displacement of the manual controller causes the craft to bank and turn, any slipping or skidding is sensed by the lateral accelerometer 196 which develops a corresponding signal across potentiometer 200. The rate of turn is sensed by rate gyro 166 which develops across potentiometer 171 a corresponding signal. The combined signals across potentiometers 200 and 171 are applied to amplifier 11 so that motor 12 operates until the displacement of rotor 120 of follow-up device 15 builds up across potentiometer 124 a signal equal and opposite to the other signals to the amplifier. The net input signal to amplifier becomes zero, and the motor stops. Rate generator 16 develops across potentiometer 128 a signal corresponding to the rate of operation of the motor to prevent the motor from over-running its assigned position.

Motor 12 displaces a tab surface (not shown) on the main control surface (not shown). As this tab applies a load to the main control surface, and the main surface is displaced from its predetermined position, developing a corresponding signal across potentiometer 145. As this signal builds up to balance the command signals from the lateral accelerometer and rate gyro, the signal developed by the shaft position transmitter across potentiometer 124 drives the motor 12 to return the auxiliary surface to normal position relative to the main surface.

When the manual controller is returned to a center position in bank, switches 912 are moved to their closed circuit position. Relay 1039 is energized, thereby energizing coil 108' to engage motor 12' and the control surfaces as described above.

By controlling the bank attitude of the craft manually, the human pilot either wishes to change the heading of the craft or to keep the craft in a turn. In either event, he may release the manual control after having banked the craft. Although hub 901, FIGURE 14, is displaced angularly from its normal position, springs 908 will return shaft 902 to its centered position relative to the hub. If the craft be in a lesser bank angle than a predetermined angle, the craft will be returned to level flight on course as described above; if it be in a greater angle the craft will continue in a turn.

When the craft is placed in a bank attitude greater than the predetermined bank angle, mercury globule 1301 will bridge either set of contacts 1302 or 1303 and energize relay 1305. The resulting disengagement of armature 1074 and contact 1080 opens the circuit to contact 1071, deenergizing relay 1072, and its armatures 397, 1077 and 1075 return to the position shown. The engagement of armature 397 and contact 398 grounds potentiometers 395, FIGURE 7; the disengagement of armature 1077 from contact 1078 deenergizes motor 381 so that the heading integrator 342 does not operate; and the engagement of armature 1075 and contact 1076 energizes motor 359 so that heading synchronizer 341 operates to keep the heading error voltage at null after the system is engaged. Thus, any heading correction is eliminated.

The aileron servo control voltage if at null at system engagement, remains at null even though the aircraft is turning, and the roll attitude is automatically maintained in a manner similar to that in which level flight is maintained; a deviation in bank angle from that at system engagement being sensed by the rate gyro signal and the roll attitude gyro voltage, and the servo and surface forrow-up signals returning the ailerons to the engagement position after the deviation is corrected.

If the bank control be engaged when the bank angle is greater than a further predetermined angle, such as an angle of 45 degrees, the automatic control system returns the craft to a 45 degree bank angle. The synchronizer 300 which tends to maintain the signal representing the bank angle of the aircraft continuously reduced to null includes a centering mechanism 304 which has mechanical stops as discussed with reference to FIGURE 10. These stops prevent the synchronizer from operating at bank angles beyond 45 degrees so that when the bank angle exceeds 45 degrees, the signal from inductive device 302 corresponds to the amount the actual bank angle exceeds the further predetermined angle. Due to relay 1039 being deenergized during controller operation and armature 416 engaging contact 418, this excess signal is not inserted into the bank channel signal chain until after pressure is released from the stick in bank and, consequently, is not cancelled by the servo position follow-up 15'.

When pressure is released on the controller, the bank channel is engaged. The engagement of armature 416 and contact 420 inserts the voltage from inductive device 302 into the aileron control. Since the sum of the other voltages in this channel is null, the bank excess signal operates motor 12' to displace the ailerons to reduce the bank angle. The servo position and surface position follow-up signals oppose the displacement of the ailerons and the rate gyro signal opposes the rolling of the craft. Thus, as the further predetermined 45 degree bank angle is approached and the bank excess signal diminishes, the other voltages return the ailerons to streamline position and the rate gyro signal tends to prevent the craft from drifting beyond the further predetermined bank angle. At this time the net input signal input to the aileron amplifier 11' is at null and the control system maintains the bank angle.

Turning now to the pitch channel, if shaft 902 of the manual controller, FIGURE 14, be centered with respect to its fore and aft travel at the time the automatic control system is engaged, switches 930 will be in a closed circuit position so as to energize relay 1066. The resulting engagement of armatures 1081 and 1082 with contacts 1083 and 1084 completes a circuit to energize clutch coils 108'' and 108''' and connect motors 12'' and 12''' with the elevator and trim surface control system. The disengagement of armature 1116 from contact 1117 removes the excitation from the fixed phase winding of motor 311, thereby fixing the position of rotor 315 so that any displacement of the craft in pitch thereafter causes an error in the relative position of rotors 315 and 295 and develops a corresponding signal across potentiometer 321. The disengagement of armature 526 from contact 528 and the engagement with contact 530 places potentiometer 321 into the elevator signal chain. The engagement of armature 1086 and contact 1087 energizes the coils 560 and 508 of the pitch attitude integrator and the altitude integrator to connect the respective motors and their inductive devices. The engagement of armature 1095 and contact 1096 completes a circuit to energize the altitude control switch arm 1110 by way of lead 1097, armature 1098, contact 1099, lead 1101, lead 1102, armature 1103, contact 1104 and lead 1108. The engagement of armature 1065 and contact 1090 completes the circuit for energizing the level flight switch arm 1140. The signal chain to the elevator servo amplifier 11'' in this configuration comprises the summation of the signals across the series connected potentiometers 321, 517, 545, 177, 145'', 124'', 162'' and 128''.

Before the automatic pilot system is engaged the various sensors and circuits of the elevator control channel operate to reduce the elevator servo control voltage to null. Pitch synchronizer 301 continuously reduces the vertical gyro voltage to null and the signal from the servo position follow-up 15'' cancels the signal from the surface position follow-up 17''. The static pressure sensor 460 operates in response to changes in altitude of the aircraft, but clutch 493 disengages inductive device 490 which provides the output information from this sensor; clutch 493 being engaged only when it is desired to maintain a particular altitude. When this is done, the clutched inductive device then provides voltages which represent the displacements from this reference altitude.

When the automatic control system is engaged, the sum of the signals to amplifier 11'' is null. Motor 311 becomes deenergized and the pitch angle and elevator position existing at this time become the control references. Any deviation from this engaged pitch attitude develops across potentiometer 321 a signal corresponding to the deviation from reference. The deviation signal is applied to the input of amplifier 11'' to operate motor 12'' to displace the control system for the elevator surface until the signal from position transmitter 15 becomes equal and opposite to all other signals; thus, the net signal to the amplifier is zero, and the motor stops with the control system displaced. The displaced system exerts a torque on the elevator surface; and, as the elevator surface becomes displaced, a signal opposing the deviation is developed across potentiometer 145''. The signal applied to amplifier 11'' operates the motor 12'' to return the control system to normal position.

As the displaced surfaces return the craft to the original attitude, the signal across potentiometer 321 decreases and the surface position transmitter 17'' provides a signal across potentiometer 145'' to return the surface to its original position. The signal from rate gyro 168 prevents the craft from overrunning the desired position due to its inertia.

In addition, if the position of the elevators at engagement is such that the position needs changing, or the trim of the craft changes due to fuel consumption or shift in loading, so that the aircraft tends to nose up or nose down, the no-longer-synchronized inductive device 303 produces a signal which is proportional to the change in pitch angle and which operates motor 12'' to change the elevator position.

As the elevator displacement increases and the aircraft starts to return towards the reference pitch attitude, the attitude signal which is combined with the servo position and surface position follow-up signals, decreases; and the position follow-up signals, being larger than the attitude signal operates servomotor 12'' to return the elevators toward the original position. The pitch displacement continues to be reduced, although at a slower rate, and a pitch attitude is reached at which the elevators are displaced sufficiently from the reference position to hold the aircraft at a constant pitch attitude. Since surface and servo position follow-up signals accompany this elevator displacement, the pitch angle which is reached is displaced from the reference pitch attitude the amount necessary to produce a pitch attitude voltage at inductive device 303 to cancel the position follow-up signals.

It is apparent that if a permanent change in elevator position is required in order to maintain a constant pitch attitude, a pitch attitude displacement signal is necessary to cancel the position follow-up signals which oppose the change in elevator position. For this reason the pitch attitude error signal is applied to an integrator 544 which develops across potentiometer 545 a signal proportional to the product of the error and the length of time that the error persists. Hence, this signal builds up as the aircraft remains displaced from the engaged reference pitch attitude to operate motor 12'' to bring the craft slowly back to this attitude. When the craft reaches the reference pitch attitude, the attitude signal from inductive device 289 is nulled and the integration signal remains at the value required to keep the craft at the reference pitch attitude.

The pitch error integration voltage provides an accurate retention of the reference pitch attitude in basically the same way as the heading integration voltage maintains an accurate heading reference. Altitude is not maintained constant at this time.

To maintain the craft at a constant altitude, switch arm 1110 is moved to a closed circuit position. Provided that switches 930 be in a closed circuit position and the glide path channel not be engaged, a solenoid 1112 is energized to maintain the switch in the closed position and relay 1130 is energized to pull its armatures downwardly from the positions shown. The engagement of armature 1131 and contact 1132 energizes coil 493 to connect motor 471 of the altitude control with the rotor 492 of inductive device 489; any displacement of the craft from this altitude thereafter develops a corresponding signal across potentiometers 487 and 488. The engagement of armature 1136 and contact 1139 supplies excitation to the fixed phase winding of motor 505 so as to develop across potentiometer 499 signals corresponding to the time integral of the altitude error to operate the elevator servomotor to reduce the altitude error signal to zero.

To manually control the pitch attitude of the craft, the human pilot merely displaces the manual controller 900 in a fore or aft direction from center. This moves one switch 930 to an open circuit position and deenergizes relay 1066. Thereupon, the disengagement of armature 11081 and 1082 of relay 1066 from contacts 1083 and 1084 opens the circuit to deenergize the elevator servo clutch coils 108″ and 108‴ so that the trim and elevator servomotors are disengaged from their surfaces. The elevator surface is controlled directly through conventional linkages (not shown), from the manual controller hub 901. The engagement of armature 1117 with contact 1116 energizes the fixed phase winding of the pitch synchronizer motor 311 so that rotor 315 will be positioned in agreement with the rotor 295 that is positioned by the pitch axis of the vertical gyro 290. This disengagement of armature 1086 from contact 1087 opens the circuit to coils 560 and 508, thereby disengaging clutches 554 and 509 of the pitch attitude integrator and altitude integrator and centering levers 557 and 514 to return rotors 562 and 511 of inductive devices 556 and 510 to a null position. The disengagement of armature 1095 from contact 1096 removes the excitation from switch arm 1110, thereby deenergizing holding relay 1112 so that the switch arm is moved to an open circuit position. The disengagement of armature 1065 from contact 1090 removes the excitation from level flight switch arm 1140. The disengagement of armature 526 from contact 630 and the engagement with contact 528 removes the pitch attitude signal from the signal chain.

When the human pilot releases the manual controller springs 925, center shaft 902 and switches 930 return to closed circuit position so that relay 1066 is energized. Thereafter the craft is maintained in its attitude at that time as described above.

So that the automatic control system will not maintain the craft at a pitch attitude greater than a predetermined attitue such as 30 degrees if the human pilot engages the pitch control channel when the pitch angle exceeds this attitude, provision is made for the control system to automatically bring the aircraft to the predetermined attitude. To this end centering device 305 has mechanical stops (not shown) as at 226, FIGURE 10, which prevent it from operating to maintain signals from inductive device 303 at null for larger pitch angles than the predetermined angle. Thus, synchronizer 301 produces at inductive device 303 signals corresponding to the extent the pitch angle exceeds the predetermined angle. The engagement of armature 526 with contact 528 keeps this signal from being applied to the system as long as the craft is manually controlled. When the automatic control system is engaged, this signal operates the elevators to reduce the pitch angle to 30 degrees in the same way that the excess bank voltage from the bank inductive device 302 operates the ailerons to reduce excessively large engagement bank angles. After the pitch angle is reduced to the predetermined pitch attitude, this attitude is maintained as described above.

When the aircraft is being controlled manually about the pitch axis, the roll and yaw control channels are effective to control the craft automatically. When the aircraft is being controlled manually about both the roll and pitch channels, these channels of the automatic control system are rendered ineffective while the yaw channel is effective to control the craft.

During level flight, the lift developed by the wings of the craft balances the weight of the craft. However, an apparent increase in aircraft weight occurs in a coordinated turn and only that portion of the weight due to gravity is supported by the available lift so the craft tends to lose altitude. Due to the gimbal axis of the vertical gyro 290 being tilted, a signal proportional to the bank angle of the craft is developed across the inductive device on the pitch axis of the vertical gyro. This signal operates the elevator servomotor to displace the elevator surfaces upwardly to increase the angle of attack and thereby increase the lift to maintain constant altitude during turning.

Level flight switch 1140, when actuated, controls the roll channel of the automatic control system to place the craft in a wing level attitude on the heading of the craft at the time the switch is actuated and controls the pitch channel to place the craft in such a pitch attitude so as to have a zero rate of climb for a predetermined interval of time. Thereafter, the craft is maintained at the average pitch attitude obtained during the zero rate of climb phase and on a constant heading.

Moving switch arm 1140 to a closed circuit position energizes solenoid 1092 and relay 1100; and, as long as the switch arm is energized, solenoid 1092 holds the switch arm in the closed circuit position and relay 1100 holds its armature in a position downwardly from the position shown. If switch arm 1110 has previously been moved to a closed circuit position to engage the altitude control, the disengagement of armatures 1221 from contact 1222 deenergizes arm 1110 so that the arm is moved to an open circuit position. However, the engagement of armature 1221 with contact 1253 provides energization for relay 1130 by way of armature 1270 and contact 1272 of relay 1261.

The energization of relay 1130 does not result in the energization of clutch coil 493 at this time because the energization of armature 1158 from contact 1160 has opened the circuit to the coil. On the other hand, the engagement of armature 1136 with contact 1139 provides excitation to motor 505 so as to develop across potentiometer 499 an output corresponding to the time integral of the rate of climb error signal.

The engagement of armature 1150 of relay 1100 with contact 1151 provides excitation to contact 1071 of relay 1039 so that relay 1072 remains or becomes energized to maintain a heading reference even though relay 1305 may be energized, thus opening the circuit to 1072 by way of armature 1074 and contact 1080 due to the movement of mercury globule 1301. The disengagement of armature 1162 from contact 1163 opens the circuit to holding solenoid 1401 so that switch arm 1056 cannot engage the instrument landing system. The disengagement of armature 1153 from contact 1154 deenergizes coils 322 and 324 of bank and pitch synchronizer clutches 323 and 324 and centering arrangements 304 and 305 return the rotors of inductive devices 302 and 303 to null; the disengagement of armature 1098 from contact 1099 and the engagement with contact 1260 removes the excitation from switch arm 1110 and supplies excitation to both relay 1261 and thermal time delay device 1265 by way of the parallel circuit formed by armatures 1264 and 1266 and contacts 1263 and 1267.

Considering the bank control channel when the level flight switch 1140 is operated, clutch 323 is opened and centering levers 304 return rotor 314 and stator 312 of inductive device 302 to center. The output of inductive device 302 now corresponds to the output due to the displacement of rotor 294 of inductive device 288 relative to stator 298 by vertical gyro 290. The pitch attitude signal corresponds to the actual displacement of the craft from level bank attitude. Removing the excitation from motor 359 of the heading synchronizer 341 stops the synchronizing, and any changes in heading thereafter develops a heading error signal at rotor 358.

The bank attitude and heading error signals operate servomotor 12′ to displace the ailerons in a direction to level the aircraft and bank rate gyro 167 provides a signal at inductive device 174 to damp the change in bank attitude. As the craft starts to level, the bank attitude signal diminishes and the servomotor and surface position follow-up signals start returning the ailerons towards streamline. Any change in heading also operates the servomotor 12′ to return the aircraft to the reference heading. The signal combination smoothly levels the craft at the heading at which the level flight switch 1140 was operated and, thereafter, holds this heading. If the aileron is to be permanently displaced to keep the craft at a constant heading, a heading error signal must be provided to cancel the servo and surface position follow-up and the bank attitude signals which oppose the displaced ailerons and craft bank. A heading integration signal then builds up at potentiometer 395 as previously discussed to balance the voltages opposing the displaced ailerons and bank angle.

Considering the pitch control channel, when the level flight switch 1140 is operated, clutch 325 of pitch synchronizer 301 opens and centering levers 305 center rotor 315 and stator 313 of inductive device 303. The output of inductive device 303 now corresponds to the relative displacement of rotor 295 and stator 299 of inductive device 289; the signal corresponds to the actual pitch attitude of the craft.

The energization of relay 1261 and time delay device 1265 begins a rate of climb control cycle. As described above, the engagement of armature 1270 and contact 1272 excites relay 1130. The disengagement of armatures 496 and 497 from contacts 482 and 483 and the engagement with contacts 480 and 481 places the rate of climb signal into the elevator signal chain. The rate of climb signal is applied whether constant altitude control is engaged or not.

The vertical gyro and rate of change of altitude signals operate the elevator servo 12″ to displace the elevators in a direction to level the aircraft, and pitch rate gyro 168 provides signals to oppose the order to change of pitch attitude. As the aircraft levels, the pitch attitude and rate of climb signals diminish and the servo and surface position follow-up signal operate servomotor 12″ to bring the elevators towards a streamline position. The surface and servo position follow-up signals are reduced to zero; if the aircraft is now level, the pitch attitude signal is reduced to null, and if this attitude produces a zero rate of climb, the rate of climb voltage is also null. Hence, the total signal input to amplifier 11″ is zero and the craft is maintained in level flight. The level flight feature does not bring the aircraft to the altitude at which the switch is operated, but levels the craft at a convenient altitude.

If displaced elevators or a slight nose up or nose down condition be required to obtain zero rate of climb, a voltage to balance the servo and surface position follow-up signal voltages opposing the displaced elevators and the vertical gyro voltage opposing the nose up or down condition is produced by integrator 498 which normally produces the altitude integration voltage. This rate of climb integration signal functions similarly to the other integration voltages previously described and is developed if the craft continues to gain or lose altitude after being brought to level flight. This integration signal soon builds up to displace the elevators sufficiently to obtain a zero rate of change of altitude, and balance the voltages which oppose this condition.

After a predetermined length of time as set by the constant of delay device 1265, for example one minute, switch arm 1273 is engaged with contact 1274 and relay 1275 is energized to disengage armature 1266 from contact 1267, thereby deenergizing the delay device 1265, and to engage the armature with contact 1276 to maintain relay 1275 energized. Thereafter arm 1273 slowly disengages from contact 1274 upon deenergization and cooling of device 1265. The disengagement of armature 1264 from contact 1263 deenergizes relay 1261 and armatures 496 and 497 return to the position shown.

The altitude control has been rendered ineffective by the disengagement of contacts 1098, and 1099, and no altitude signal from inductive device 490 is applied to the signal chain. The signals from inductive devices 302 in roll and 303 in pitch control the craft to maintain the heading and the average pitch attitude of the craft as described previously. Hence, unless the altitude control switch 1110 is closed, the craft will maintain the established pitch attitude and will tend to gain altitude as fuel is consumed and the craft becomes lighter.

When the instrument landing system is to be placed into operation for controlling the craft along the range beam, the craft is maneuvered to be bracketed by the range beam; receiver 601 of FIGURE 11 is tuned to the range beam frequency, the heading controller 798 is set to the heading of the beam and switch arm 1056 is moved to a closed circuit position. This energizes solenoid 1401 to maintain the switch arm in the closed position and relay 11072 to pull its armatures downwardly from the position shown.

The engagement of armature 1420 of relay 11072 and contact 1421 energizes clutch coils 668, 694, 728 and 818 of FIGURE 11 to connect the motor of the localizer channel with the inductive devices. The disengagement of armature 1442 and contact 1443 provides an interlock between the instrument landing system and the level flight switch to render the level flight switch 1140 ineffective when the localizer control is rendered effective. The disengagement of armature 430 and contact 425 and the engagement with contact 429 places the output signal of potentiometer 427 into the aileron signal chain, and the disengagement of armature 1410 from contact 1411 and engagement with contact 1413 places the output signal of potentiometer 846 into the rudder signal chain. The disengagement of armature 11076 from contact 1081 and its engagement with contact 1445 provides excitation to the armature 1416 of localizer and glide path interlock relay 1458.

Upon displacement of the craft from the localizer beam, a signal developed by receiver 601, FIGURE 11, and corresponding in sense and magnitude to the direction and extent of the displacement is applied to modulator 609 which develops at lead 662 an alternating current signal output, the phase of which is dependent on the polarity (or sense) and the amplitude of which is dependent on the magnitude of the signal at leads 603. This alternating current signal applied to amplifier 632 operates motor 634 to displace rotor 670 of inductive device 642 to develop at wiper 658 a signal equal and opposite to the signal at winding 629; the net input to amplifier 632 at this time is zero, and the motor stops. The signal output from inductive device 642, therefore, corresponds in phase and amplitude to the direction and extent of craft deviation from the beam. This signal from potentiometer 648 is applied to both a "wash out" circuit 676 and integrator circuit 674, and also from potentiometer 650 through potentiometer 640, coupling transformer 764, limiter 766, coupling transformer 772, and potentiometer 774 to junction 830 which is connected with both the rudder and aileron channels.

The displacement signal is for short time stabilization and is cancelled or "washed out" by arrangement 676. To this end, the signal from potentiometer 648 is applied through potentiometer 726 and 742 to amplifier 710 to operate motor 712 and displace rotor 730 of inductive device 722 to produce a signal across potentiometer 726 equal and opposite to that signal from potentiometer 648. Rate generator 714 provides a feed back signal so that the rate of operation of motor 714 corresponds with the amplitude of the input signal. The rate of "wash out" of the signal at potentiometer 726 depends upon the relative portion of the signal fed to amplifier 710 and the relative portion of the rate generator signal fed back to amplifier 710. Armatures 751 and 759 provide for changing these quantities to change the "wash out" time for range and localizer operations.

Controlling the craft by a signal such as developed across potentiometer 650 and corresponding to a function of angular displacement of the craft from the beam may result in oscillation of the craft about the beam. However, motor 712 operates as a function of the change in displacement of the craft from the beam, and rate generator 714 develops a signal corresponding to the rate of operation of motor 712, the signal from rate generator 714 coupled by transformer 644 across potentiometer 646 provides a rate of change of beam error signal to damp the operation of the control system.

Integrator 674 provides a signal which reduces the steady state beam error signal to a minimum. For example, should the craft be displaced from the beam for a sustained length of time due to a cross wind or a trim condition such as unsymmetrical power, a signal corresponding to the integral of the error is applied to the control system by the integrator. Thus, the integrator signal at potentiometer 700 provides the proper crab angle for tracking the beam.

The displacement, rate of displacement and integral of displacement signals are based upon the angular displacement from the beam whereas what is desired is the change with respect to linear distance of the craft from the beam. The rate of change of linear distance with respect to the beam is the product of the airspeed and the difference between the actual flight path and the beam. The heading signal from inductive device 796 provides an approximate measure of the rate of change of linear error. To insure that the heading signal and beam signal will head the craft toward the transmitter, the heading signal is modified by an expander arrangement 796.

To tend to provide a coordinated turn to correct for displacement from the beam, the combined signal comprised of beam displacement, rate of displacement, integral of displacement and heading error signals at terminal 830 is applied to both the rudder and aileron channels. The signal is applied to the rudder channel through an isolation stage comprised of amplifier 842 and transformer 844 to potentiometer 846, and to the aileron channel through coupling transformer 831, limiter 832, filter 837, and isolator stage 840 to potentiometer 427.

As the craft approaches the localizer beam, the radio is tuned to localizer beam and switch arm 1457 is moved to a closed position to energize relay 1458 and move its armatures downwardly from the position shown. The disengagement of armatures 751 and 759 from contacts 750 and 758 and the engagement with contacts 752 and 760 changes the time constant of the rate and "wash out" of the "wash out" circuit 676. The engagement of armature 1416 and contact 1481 provides an interlock between the glide path channel and the localizer channel so that the glide path channel can only be operated after the localizer channel has been rendered effective to operate the craft. The action of the control system in response to displacement from the localizer beam is identical to the above displacement from the range beam.

Receiver 602, FIGURE 12, is tuned to the glide path beam and switch 1482 is moved to a closed circuit position. This energizes a solenoid 1500 to hold the switch and carries relay 1502 to move its armatures downwardly from the position shown. The disengagement of armature 1103 from contact 1104 removes the excitation from altitude control switch arm 1110 and the switch is moved to an open circuit position thereby rendering the altitude control ineffective on the craft. The engagement of armature 1510 and contact 1511 energizes the glide path system clutch coils 673, 695 and 729 and clutch 1600 contained in the altitude sensor 450, FIGURE 8. The disengagement of armature 541 from contact 534 and engagement with contact 536 places the glide path channel signal into the elevator channel. The engagement of armatures 1521 and 11521 and contacts 1524 and 11524 provides excitation to relays 1039 and 1066 disabling the "control stick steering" so that displacements of the stick do not affect the operation of the instrument landing system. Armature 1510 engaging contact 1511 energizes the clutch 1600, FIGURE 8, drivably engaging the motor of the altitude control with three wipers A, B, C. These potentiometers change the ratio of the signal for the localizer channel of the flight computer to the rudder and aileron; more rudder and less aileron being utilized as the craft approaches the landing strip so that turns are progressively made flatter and less coordinated as the craft approaches the ground, and less aileron per degree of craft displacement as the craft approaches the transmitter.

Upon displacement of the craft in a vertical direction from the glide path, receiver 602 develops across output leads 604 a signal which corresponds in magnitude and sense to the extent and direction of deviations of the craft from the glide path beam. In response to these signals, modulator 610 develops alternating current output signals having a reversible phase and amplitude relative to the direction and extent of deviation of the craft from the beam. This output operates motor 635 to drive rotor 671 relative to stator 653 to develop an output at wiper 661 equal and opposite to the output of modulator 610 so that the input to amplifier 633 becomes zero. The output from potentiometer 651 is applied by way of potentiometer 641 and by a coupling transformer 765 applied to a limiter 767 and through a coupling transformer 773 to a potentiometer 775. The signal across potentiometer 641 is "washed out" as a function of time through the operation of motor 713 displacing rotor 731 in a manner similar to that described above for the localizer channel.

The signal from wiper 675 is also applied to integrator 677 which develops a signal corresponding to the integral of the beam displacement signal to correct for any persistent displacement of the craft from the beam. A rate signal across potentiometer 647 from rate generator 715 provides a rate of displacement signal to damp oscillation of the craft about the beam. These rate and integral signals are combined at potentiometer 775 with the displacement signal and coupled by transformer 782 to a limiter 850 and a filter 851 and thence coupled by way of transformer 852 and isolation stage 853 to a potentiometer 539. Also added to potentiometer 539 is a signal from potentiometer 856 coupled across transformer 855. This signal is adjusted to balance the signal from the vertical gyro inductive device 303 when the craft is at the angle of the glide path beam, this angle normally being two and one-half degrees below the horizon. Thus, the signal chain is balanced when the craft is on the glide path beam, but upon deviation therefrom a signal corresponding to the angle of deviation, rate and integral of deviation is applied through the elevator chain to the elevator servomotor 12" to displace the surface to return the craft to the beam.

For a given displacement of the craft from reference, a small displacement of the surface from a normal position is required when the craft is travelling at higher speed than is required when the craft is travelling at its low speed. Accordingly, potentiometers 145, 145', and 145" are adjusted by the airspeed sensor 185, FIGURE 9, so as to give the proper signal for the airspeed of the craft.

The foregoing has presented a novel automatic control system capable of maintaining the craft in a predetermined attitude, at a predetermined altitude, and on the track of a range beam, a localizer beam or a glide path beam, or on compass heading. The novel control system may stabilize the craft about the pitch and yaw axes while the craft is being flown manually about the roll axis, may stabilize the craft about the yaw and roll axes while the craft is being controlled manually about the pitch axis, and may stabilize the craft about the yaw axis while the craft is being controlled manually about the pitch and roll axes.

Interlocks are provided in the system so that the craft may be controlled manually while the craft is tracking the range or localizer beams but may not be controlled manually when the craft is tracking the guide path beam, so that the glide path beam may be engaged when only the craft is tracking the localizer beam, and so that the altitude control is rendered ineffective when the glide path control is rendered effective. A further interlock is provided between the manual controller and altitude control, whereby, when the control is manually applied in pitch, the altitude controller is brought to an "off" position. A level flight provision is made by which the rate of climb or dive is measured and the craft is brought to a zero rate of climb where it is held for a predetermined interval of time and thereafter control is shifted to an attitude reference to maintain the craft in its last attitude. Novel means is also provided to maintain the craft on a new heading after the craft has been placed in a banked attitude, or to maintain the bank attitude, depending upon the extent of the banking.

Although only one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

What is claimed:

1. A control system for the movable yaw, roll and pitch control surfaces, comprising power means for each of said surfaces, means for connecting and disconnecting each of said power means with a respective surface for moving the surface, a controller displaceable manually from a reference position for moving one of said surfaces, and means rendered operative by the controller displacement for operating said connecting and disconnecting means to disconnect said power means and said one control surface, and maintain said power means connected to the other control surfaces.

2. A control system for the yaw, roll and pitch control surfaces of an aircraft, comprising means automatically operable for moving each of said surfaces to control said craft, and means manually operable for moving one of said control surfaces, said manually operable means including a controller displaceable from a reference position and means rendered operative by the displacement of said controller to make said automatically operable means ineffective on said one surface while remaining effective on the other of said surfaces, and said automatically operable means including means for conditioning said automatically operable means during said manual control to avoid suddenly changing the condition of the craft when said one surface is placed under automatic control.

3. A control system for a craft comprising means automatically operable for controlling said craft about each of its three control axes and including power means for operating craft control surfaces, means manually operable for operating the control surfaces for selectively controlling the attitude of said craft about two of its axes, and means operable when said manually operable means is operated to control the craft about one of said axes for rendering said power means ineffective on the associated control surface only.

4. A control system for a craft comprising means automatically operable for controlling said craft about each of its three control axes, means manually operable for selectively controlling the attitude of said craft about two of its axes, interlocking means operable when said manually operable means is operated to control the craft about an axis for normally rendering said automatically operable means ineffective on any axis which is manually controlled, said automatically operable means including first means operable in response to the displacement of said craft from a horizontal guide beam for returning said craft to the beam, second means operable in response to the displacement of said craft from a vertical guide beam, means preventing said second means from being placed into operation until after said first means is placed into operation, and means operable when said second means is placed into operation for rendering said interlocking means incapable of rendering said automatically operable means ineffective when said manually operated means is operated.

5. In a control system for an aircraft having a control surface, means receiving a voltage whose sense and magnitude correspond to the direction and extent of displacement of said craft from a reference beam for developing a beam displacement signal corresponding in phase and amplitude to the sense and magnitude of said voltage, an integrating system including a first signal generator and motor means responsive to said beam displacement signal for actuating said signal generator at a rate corresponding to the amplitude of said signal to develop a signal corresponding to the integral thereof, a canceller system including a second signal generator, a second motor receiving said beam displacement signal and responsive thereto and actuating said second signal generator until a component of the signal developed cancels said beam displacement signal, and a rate generator driven by said second motor for developing a signal corresponding to the rate of motor operation, means summing said displacement, integral, cancelling signal, and rate signal, and power means responsive to said signal summation for displacing said surface correspondingly to return the craft toward said beam.

6. In a system for controlling the surface of an aircraft, means receiving a voltage whose sense and magnitude correspond to the direction and extent of displacement of said craft from a reference beam for developing a beam displacement signal corresponding in phase and amplitude to the sense and magnitude of said voltage, integrating means including a motor for receiving said beam displacement signal and a signal device actuated by said motor for developing a signal corresponding in phase and amplitude to the integral of said beam displacement signal, canceller means including a motor, rate generator, and signal device, said last named motor receiving said displacement signal and actuating said last device until a component of the signal developed cancels the displacement signal received, said last named motor actuating said rate generator to develop a velocity signal corresponding to the rate of motor operation, means combining said displacement, integral, canceller signal and velocity signals, and means responsive to said signal combination for displacing said surface correspondingly to return said craft to said beam.

7. An aircraft control system comprising means automatically operable for controlling the bank attitude of said craft, beam responsive means responsive to displacement of the craft from a guide beam for controlling said automatically operable means to maintain the craft on the beam, means manually operable for controlling the bank attitude of the craft, and interlock means operable by the manually operable means and connected to said automatically operable means and to the beam responsive means for rendering said automatically operable means ineffective on said craft when said manually operable means is operated, said interlock means rendering said automatically operable means effective on said craft when said manually operable means is released but rendering said beam responsive means inoperable on said automatically operable means if said beam responsive means was operable prior to the manual operation.

8. A system for moving a control surface of an aircraft comprising signal means having two parts relatively displaceable for developing a signal, condition sensing means for positioning one of said parts, a servomotor operable in response to said signal for positioning the other of said parts so as to cancel said signal, power means responsive to said signal, and further means rendering said power means effective and ineffective to move said surface, normally centered means manually displaceable from center to move said surface manually, and means operable in response to the centering of said manually displaceable means for rendering said servomotor inoperable for positioning said other part and for operating said further means to render said power means effective to move said surface and operable in response to displacement from center for rendering said servomotor operable in response to said signal and for operating said further means to render said power means ineffective to move said surface.

9. A craft control system comprising means automatically operable for controlling the bank angle of said craft, means manually operable for controlling the bank angle of the craft, means for rendering said automatically operable means ineffective on said craft when said manually operable means is operated, and switching means responsive to the bank angle of the craft for causing said automatically operable means to return the craft to a level bank angle when said manually operable means is released if the bank angle has not exceeded a predetermined angle and for causing said automatically operable means to maintain the existing angle if said predetermined angle is exceeded.

10. In a control system for a craft, means for selectively rendering said system effective and ineffective to control said craft, and means responsive to the displacement of the craft with respect to a level flight attitude about the roll axis at the time said control system is rendered effective for maintaining said craft in the displaced attitude existing at the said time when said displacement exceeds a predetermined amount and for maintaining said craft on a heading corresponding to the heading of the craft at the said time when said displacement does not exceed said predetermined amount.

11. In a control system for a craft, means for selectively rendering said system effective and ineffective to control said craft, means responsive to the displacement of the craft with respect to a level flight attitude about the roll axis at the time said control system is rendered effective for maintaining said craft on a heading corresponding to the heading of the craft at the said time when said displacement is less than a predetermined amount, for maintaining said craft in the displaced attitude existing at the said time when said predetermined amount is exceeded, and for maintaining said craft in a further predetermined attitude when said displacement exceeds said further predetermined attitude.

12. A craft control system comprising means automatically operable for controlling the bank attitude of said craft, means manually operable for controlling the bank attitude of said craft, means operable by said manual means for rendering said automatically operable means ineffective on said craft when said manually operable means is operated, inertia means for maintaining a fixed position in space, means for determining the dynamic vertical of the craft, and means responsive to the inertia and dynamic vertical determining means and controlling the automatically operable means for causing said automatically operable means to return the craft to level flight when said difference does not exceed a predetermined amount at the time said manually operable means is released and for causing the automatically operable means to maintain the existing attitude when said difference exceeds said predetermined amount.

13. A control system for a craft comprising attitude reference means for developing a control signal corresponding to the error in craft attitude from a datum attitude, a motor responsive to said signal for controlling said craft to correct for the error, means manually operable for controlling the attitude of said craft, means operable by the manually operable means for rendering said motor ineffective on said craft when said manually operable means is operated, and automatically operable synchronizing means responsive to the control signal for changing said datum attitude during the time said manually operable means is operated so that said datum attitude corresponds to the attitude at which said manually operable means is released.

14. A control system for a craft comprising means automatically operable for controlling the bank attitude of said craft including means for developing a signal corresponding to the error between the craft heading and a datum heading, and integrating means for developing a further signal corresponding to the integral of the error signal to correct for steady state errors, whereby said automatically operated means changes the bank attitude to correct said error, manually operable means for controlling the bank attitude of the craft, and means interconnecting said automatically and said manually operable means for rendering said automatically operable means ineffective on said craft when said manually operable means is operated including means for changing said datum during the time said manually operable means is operated so that said datum becomes the heading at which the manually operable means is released, and means operable during the time the manually operable means is operated for maintaining the output of the integrating means at zero.

15. A system for controlling the yaw, roll and pitch control surfaces of an aircraft, comprising power means automatically operable for moving each of said surfaces to control said craft, means manually operable for disengaging said power means from said roll control surface and moving the latter surface manually whereby said craft may be banked and turned, and means responsive to craft banking for maintaining the craft in the banked attitude at which said manual control is released when craft banking exceeds a predetermined angle and returning the craft to level flight about the bank axis when craft banking is less than the predetermined angle.

16. A control system for the yaw, roll and pitch control surfaces of an aircraft, comprising automatically operable means moving each of said surfaces to control said craft, manually operable means for moving said pitch control surface including a controller displaceable from a reference position, and means rendered operative by a predetermined displacement of said controller to make said automatically operable means ineffective on said pitch control surface while remaining effective on the yaw and roll surfaces.

17. A control system for positioning a surface to control the displacement of a craft about an axis thereof, comprising means for developing a signal corresponding to the extent of said displacement, an electromechanical integrator responsive to said signal for developing a signal corresponding to the integral thereof, means for developing a signal corresponding to the rate of said displacement, power means for moving said surface, and means summing said signals for the operation of said power means so that said first and third named signals operate said power means to damp short period displacement of the craft about said axis and said second named signal operates said power means to damp longer period displacements.

18. A control system for a craft having a surface for controlling craft attitude and comprising means for developing a signal corresponding to the rate of climb of said craft, means for developing a signal corresponding to displacement of said craft from a predetermined attitude, means for developing a signal corresponding to displacement of said craft from a predetermined altitude, power means for said surface operated in response to said attitude and altitude signals, and means for returning the craft to level flight including means operable for rendering said altitude signal ineffective on said power means and for operating said power means by said rate of climb signal for an interval of time until the rate of climb is zero and the craft is in level flight and thereafter operating said power means from said altitude signal.

19. A control system for the movable pitch control surface of a craft, comprising means automatically and manually operable for positioning said surface to control the pitch attitude of a craft, said automatically operable means including means for developing a signal corresponding to the extent of deviation of said craft from a predetermined pitch attitude, means for developing a signal corresponding to the deviation of said craft from a predetermined altitude, means for developing a signal corresponding to the integral of said altitude deviation signal, means for combining said attitude, altitude and altitude integral signals, means for developing a signal corresponding to the integral of said combined signals, means for developing a signal corresponding to the rate of change of pitch attitude, means for summing said rate, and said last named integral signal, and power means responsive to said last named signal for positioning said surface.

20. Aircraft control apparatus comprising a source of alternating reference voltage, a source of unidirectional voltage corresponding to a condition, means energized by said voltages for deriving an alternating signal voltage whose amplitude and phase depend upon said unidirectional voltage, a reversible motor controlled by said signal voltage to operate at a rate corresponding to the amplitude of said signal, means actuated by said motor for developing an output corresponding to the amplitude and time duration of said signal, and an automatic pilot system including means for positioning a control surface of the craft in accordance with said output.

21. A control system for operating the yaw, roll and pitch control surfaces of a craft, comprising power means for automatically operating each of the surfaces, means interconnecting the power means and the surfaces, a manually operable controller displaceable from a reference position for moving one of the control surfaces, and means for rendering said interconnecting means ineffective for connecting said one surface and associated power means while maintaining the power means effective on the other control surfaces upon displacement of the controller from reference position.

22. A control system for the movable yaw, roll and pitch control surfaces of a craft, comprising power means automatically operable for moving each of said surfaces, means manually operable for moving the roll and pitch control surfaces, means for connecting and disconnecting each of said power means with a respective surface, and means rendered operative by the operation of said manually operable means in manually moving a control surface for operating said connecting and disconnecting means to disconnect said automatically operated means from said control surface while continuing to connect said automatically operable means to the other control surfaces.

References Cited in the file of this patent

UNITED STATES PATENTS

| | | |
|---|---|---|
| 2,143,140 | Carlson | Jan. 10, 1939 |
| 2,595,309 | Slater | May 6, 1952 |
| 2,611,560 | Haroum et al. | Sept. 23, 1952 |
| 2,659,554 | Murphy | Nov. 17, 1953 |
| 2,674,423 | Noxon | Apr. 6, 1954 |
| 2,698,723 | Kutzler | Jan. 4, 1955 |
| 2,759,137 | Kutzler | Aug. 14, 1956 |
| 2,861,757 | Callen et al. | Nov. 25, 1958 |

Notice of Adverse Decision in Interference

In Interference No. 93,115 involving Patent No. 3,002,713, P. A. Noxon, J. E. Taylor and J. Jarvis, AIRCRAFT CONTROL SYSTEM, final judgment adverse to the patentees was rendered May 7, 1965, as to claims 9 and 10.

[*Official Gazette June 22, 1965.*]